United States Patent
Dunn et al.

(10) Patent No.: US 11,922,118 B2
(45) Date of Patent: *Mar. 5, 2024

(54) SYSTEMS AND METHODS FOR COMMUNICATION SYSTEM INTENT ANALYSIS

(71) Applicant: LIVEPERSON, INC., New York, NY (US)

(72) Inventors: Matthew Dunn, Arlington, MA (US); Joe Bradley, Seattle, WI (US); Laura Onu, Redmond, WA (US)

(73) Assignee: LIVEPERSON, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/939,049

(22) Filed: Sep. 7, 2022

(65) Prior Publication Data
US 2023/0105806 A1    Apr. 6, 2023

Related U.S. Application Data

(63) Continuation of application No. 17/126,676, filed on Dec. 18, 2020, now Pat. No. 11,468,231, which is a
(Continued)

(51) Int. Cl.
*G06F 40/205* (2020.01)
*G06F 40/169* (2020.01)
*G06N 20/00* (2019.01)

(52) U.S. Cl.
CPC .......... *G06F 40/205* (2020.01); *G06F 40/169* (2020.01); *G06N 20/00* (2019.01)

(58) Field of Classification Search
CPC ...... G06F 40/20; G06F 40/205; G06F 40/211; G06F 40/216; G06F 40/221; G06F 40/226; G06F 40/232; G06F 40/237; G06F 40/242; G06F 40/247; G06F 40/253; G06F 40/258; G06F 40/263; G06F 40/268; G06F 40/274; G06F 40/279
See application file for complete search history.

(56) References Cited

U.S. PATENT DOCUMENTS 6,882,723 B1 *  4/2005  Peterson ................. H04M 3/36
                                                    379/265.06
6,898,277 B1 *  5/2005  Meteer ................ H04M 3/5166
                                                    379/265.06
(Continued)

FOREIGN PATENT DOCUMENTS

WO    WO 2019/040591 A1    2/2019

OTHER PUBLICATIONS

International Search Report and Written Opinion for PCT Application No. PCT/US2020/037264 dated Sep. 15, 2020, 12 pages.
(Continued)

*Primary Examiner* — Michael N Opsasnick
(74) *Attorney, Agent, or Firm* — POLSINELLI LLP

(57) ABSTRACT

The present disclosure relates generally to systems and methods for analyzing intent. Intents may be analyzed to determine to which device or agent to route a communication. The analyzed intent information can also be used to formulate reports and analyze the accuracy of the identified intents with respect to the received communication.

27 Claims, 20 Drawing Sheets

Related U.S. Application Data continuation of application No. 16/899,223, filed on Jun. 11, 2020, now Pat. No. 10,902,199.

(60) Provisional application No. 62/860,520, filed on Jun. 12, 2019.

(56) References Cited

U.S. PATENT DOCUMENTS

| | | | |
|---|---|---|---|
| 6,937,705 B1* | 8/2005 | Godfrey | H04M 15/43 379/26.01 |
| 7,003,079 B1* | 2/2006 | McCarthy | H04M 3/493 379/265.06 |
| 9,916,538 B2* | 3/2018 | Zadeh | A61B 5/165 |
| 10,902,199 B2* | 1/2021 | Dunn | G06F 16/3329 |
| 11,468,231 B2* | 10/2022 | Dunn | G06F 16/3329 |
| 2004/0006566 A1 | 1/2004 | Taylor | |
| 2010/0070448 A1 | 3/2010 | Omoigui | |
| 2012/0209708 A1* | 8/2012 | Ramer | G06F 16/9535 705/14.51 |
| 2017/0106539 A1* | 4/2017 | Maisonnier | G10L 15/1815 |
| 2017/0279906 A1 | 9/2017 | Laird-McConnell | |
| 2018/0053119 A1 | 2/2018 | Zeng et al. | |
| 2018/0204111 A1* | 7/2018 | Zadeh | G06V 10/764 |
| 2018/0260854 A1 | 9/2018 | Balasubramanian | |
| 2018/0322403 A1 | 11/2018 | Ron et al. | |
| 2019/0166069 A1 | 5/2019 | Yao et al. | |
| 2020/0175987 A1* | 6/2020 | Thomson | G10L 15/26 |

OTHER PUBLICATIONS

Non-Final Office Action dated Jul. 31, 2020 for U.S. Appl. No. 16/899,223; 7 pages.

Notice of Allowance dated Sep. 23, 2020 for U.S. Appl. No. 16/899,223; 10 pages.

Non-Final Office Action dated Mar. 16, 2022 for U.S. Appl. No. 17/126,676; 20 pages.

Notice of Allowance dated Jun. 8, 2022 for U.S. Appl. No. 17/126,676; 9 pages.

\* cited by examiner

SYSTEMS AND METHODS FOR COMMUNICATION SYSTEM INTENT ANALYSIS

CROSS-REFERENCE TO RELATED APPLICATIONS

The present application is a continuation of U.S. patent application Ser. No. 17/126,676 filed Dec. 18, 2020, now U.S. Pat. No. 11,468,231, which is a continuation of U.S. patent application Ser. No. 16/899,223 filed Jun. 11, 2020, now U.S. Pat. No. 10,902,199, which claims the priority benefit of U.S. Provisional Patent Application No. 62/860,520 filed on Jun. 12, 2019, all of which are incorporated herein by reference in their entirety for all purposes.

FIELD

The present disclosure relates generally to communication processing using artificial-intelligence (AI). More specifically, techniques are provided to deploy an AI platform to identify and analyze intents received in natural language queries, and to improved performance of a communication system with an AI platform using intent analysis associated with system communications.

SUMMARY

The term embodiment and like terms are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings and each claim.

Examples described herein relate to communication systems configured to provide information to users with artificial intelligence (AI) driven systems. Such systems can be configured to respond to a wide variety of user inquiries. Given that the nature of the user inquiry covers a broad possible range, categorizing a user intent associated with system communications is a primary concern in allowing AI systems to facilitate adequate responses to user communications.

As described herein, "intent" refers to machine-based communication system categories associated with user issues addressable by a communication system. Devices in a communication system can use machine learning and AI with intent processing systems to manage communications with users. Different system implementations can use different intent groupings and categories. For example, a communication system for addressing user questions related to medicine can use different intent categories than a communication system to provide user support for a hardware device. While a communication system for a medical system may have intent categories such as "schedule an appointment", "get test results", and "refill a prescription", a device support system can have alternative intent categories such as "get operating instructions", "request warranty repairs", "speak with a technician", or "get troubleshooting assistance". Additionally, intent categories can be structured with varying levels of specificity (e.g. using multiple sub-category levels and trees). For example, an intent category of "troubleshooting assistance" can be associated with categories such as "power-on problems", "operating errors", and "configuration errors". Each of these subcategories can further have subcategories associated with known categories. For example, device failure categories identified in previous user communications can be assigned intent categories based on machine analysis and AI processing of user communications.

In some examples, a system can support many types of systems (e.g. support for multiple businesses and communication types), and so different intent analysis trees can determine an initial set of intent categories that can be refined through multiple communications with a user.

As a user communicates with a system, natural language processing operations of a computing device can be used to associate user communications with intent categories, and to refine the associations with intent categories and intent sub-categories as communications occur over time. Examples described herein improve the operation of devices in a communication system by improving the efficiency of AI and machine based communications, reducing the processing resources used to facilitate responses to user communications, and improving the quality of machine driven communications in such a system.

Certain examples of the present disclosure include a computer-implemented method. The method may include receiving a communication from a device. The communication may include one or more words. The device may be associated with one or more actions. The method may further include automatically parsing the communication to identify one or more operative words that correspond to the action associated with the device. The method may further include identifying an intent associated with the one or more operative words. The intent may define the action. The method may further include facilitating annotation of the intent. Annotation may define a quality of an association between the communication and the intent. The method may further include calculating a metric for the intent based on the quality of the associated. The method may further include facilitating display of the intent and the metric.

Certain embodiments of the present disclosure include a system. The system may include one or more data processors; and a non-transitory computer-readable storage medium containing instructions which, when executed on the one or more data processors, cause the one or more data processors to perform the methods described above and herein.

Certain embodiments of the present disclosure include a computer-program product tangibly embodied in a non-transitory machine-readable storage medium, including instructions configured to cause a data processing apparatus to perform the methods described above and herein.

BRIEF DESCRIPTION OF THE DRAWINGS

The present disclosure is described in conjunction with the appended Figures.

Figure 1:
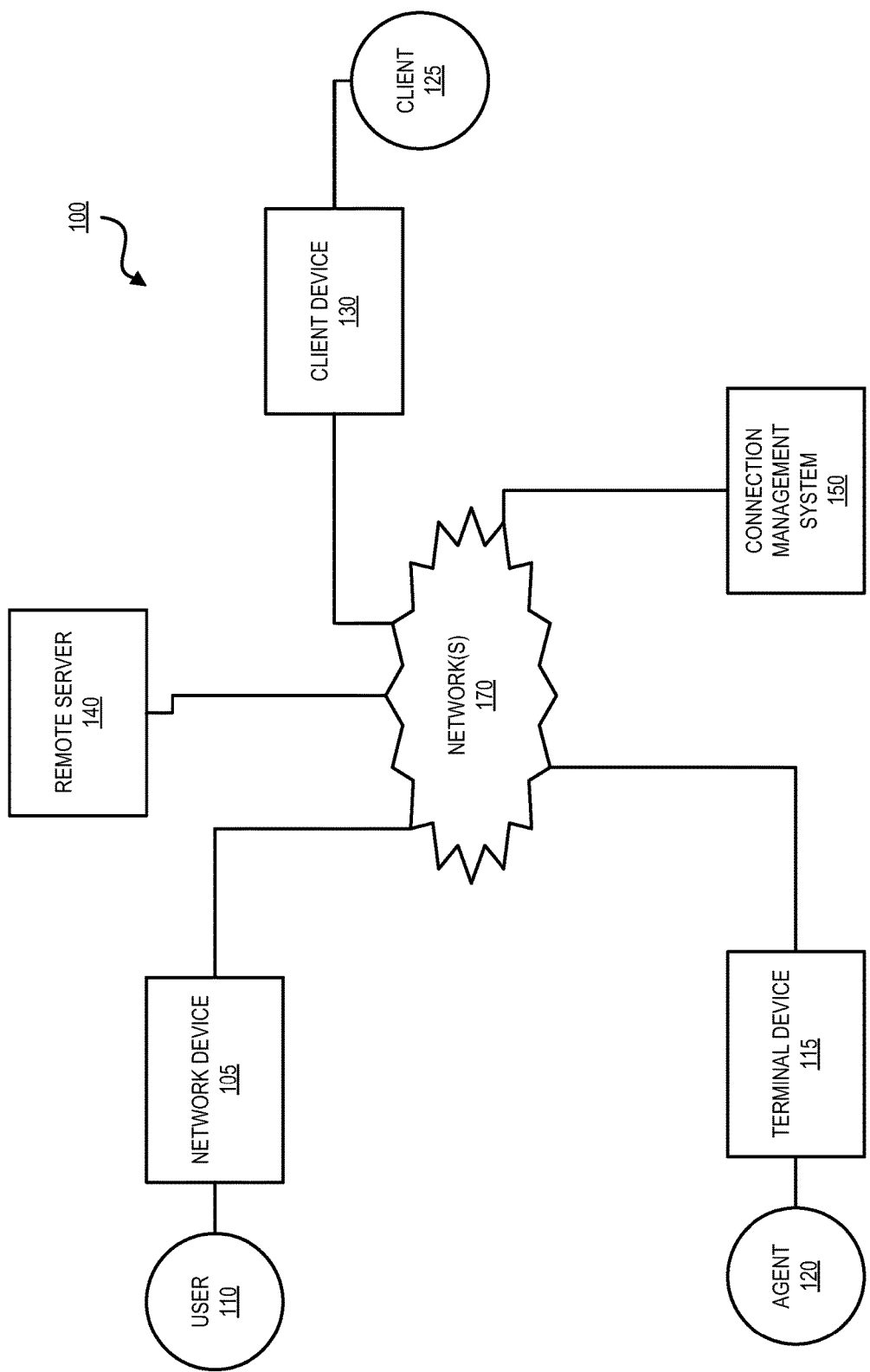
FIG. 1 shows an example embodiment of a network interaction system in accordance with some aspects of the present technology.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples and is not intended to limit the scope, applicability or configuration of the disclosure. Rather, the ensuing description of the examples will provide those skilled in the art with an enabling description for implementing examples. It is understood that various changes can be made in the function and arrangement of elements without departing from the spirit and scope as set forth in the appended claims.

Examples described herein relate to communication systems configured to provide information to users with artificial intelligence (AI) and machine analysis driven systems. Such systems can, for example, use natural language processing (NLP), natural language analysis (NLA), neural networks, and various AI and machine learning tools to analyze and improve communications systems. Such systems can be configured to respond to a wide variety of user inquiries. Given that the nature of the user inquiry covers a broad possible range, categorizing a user intent associated with system communications is a primary concern in allowing AI systems to facilitate adequate responses to user communications. As described herein, such systems can be dynamically updated based on feedback from use to improve performance and matching of words from user communication to intent categories and actions associated with intent categories. In different implementations, this updates can be automatically performed on a periodic bases as data is gathered, or as part of continuous real-time feedback to integrate user usage data into the datasets for AI system using machine learning.

As described herein, "intent" refers to machine-based communication system categories associated with user issues addressable by a communication system. A communication system can receive communications with one or more words (e.g. text communications or data translated into text) and can part the words to identify associations between works in the communication and actions available through a communication system.

"Actions" for a communication system can refer to communication routing and communication response options for an AI driven communication system. The actions available in a system can be associated with intent categories. For example, a user intent can be to speak with a repair specialist, and an action can be routing the communication to a repair specialist. Another example is a general user intent associated with device support, and intent categories can include various trees of device troubleshooting options. Facilitating a user's navigation through troubleshooting information is considered an action (or multiple actions) associated with a user device and user communications. Devices in a communication system can use machine learning and AI with intent processing systems to manage actions taken by the system in response to communications with users. Different system implementations can use different intent groupings and categories. For example, a communication system for addressing user questions related to medicine can use different intent categories than a communication system to provide user support for a hardware device. While a communication system for a medical system may have intent categories such as "schedule an appointment", "get test results", and "refill a prescription", a device support system can have alternative intent categories such as "get operating instructions", "request warranty repairs", "speak with a technician", or "get troubleshooting assistance". Additionally, intent categories can be structured with varying levels of specificity (e.g. using multiple sub-category levels and trees). For example, an intent category of "troubleshooting assistance" can be associated with categories such as "power-on problems", "operating errors", and "configuration errors". Each of these subcategories can further have subcategories associated with known categories. For example, device failure categories identified in previous user communications can be assigned intent categories based on machine analysis and AI processing of user communications. Each intent category can be associated with an action. Such actions can include generating responsive communications to further narrow or identify more specific intent categories, request user information for a subsequent action, connecting a user with a particular service, providing a user with information for a subsequent follow-up, or informing a user that the system is unable to assist the user.

As a user communicates with a system, natural language processing operations of a computing device can be used to associate user communications with intent categories, and to refine the associations with intent categories and intent sub-categories as communications occur over time. In some examples, a system can facilitate annotation of a user intent in a particular communication. An annotation as described herein characterizes an association between the user communication and an intent category assigned to the communication. This annotation can, for example, assess a strength of the correlation between the user communication and an intent category assigned to the user communication. Identification of repeated low quality or low correlation associations for particular types of user communications and intent categories can result in machine learning systems automatically generating an alert or automatically generating new intent categories. In some examples, metrics for intent categories and user communications can be generated and used to improved communication system operations. In addition to assessments on how well user communications correlate to assigned intent categories, other "quality" metrics can be used in system analysis. Such quality metrics can be based on user feedback and subjective user rankings of a quality of a communication session. Such quality metrics can be based on comparative metrics between different human agents that use AI driven communication systems, including information about communication session times and agent communication volumes. Examples described herein improve the operation of devices in a communication system by improving the efficiency of AI and machine based communications, reducing the processing resources used to facilitate responses to user communications, and improving the quality of machine driven communications in such a system. Additionally, user interfaces described herein can improve the operations of devices in a communication system by reducing the processing resources used to generate a set of analysis data and improving the efficiency of associated operations for managing AI assisted communication systems.

FIG. 1 shows a block diagram of an embodiment of a network interaction system 100 which implements and supports certain embodiments and features described herein. Certain embodiments relate to establishing connections between a network device 105 (which can be operated by a user 110), and a terminal device 115 (which can be operated by an agent 120) and/or a client device 130 (operated by a client 125).

In some embodiments, a user 110 can be an individual browsing a web site or accessing an online service provided by a remote server 140. In some embodiments, user 110 can be an individual looking to have a service performed on their behalf. Such a service can include having a question answered, operating another device, getting help from an agent with a task or service, conducting a transaction, etc.

A client 125 can be an entity that provides, operates, or runs the website or the online service, or individuals employed by or assigned by such an entity to perform the tasks available to a client 125 as described herein.

The agent 120 can be an individual, such as a support agent or sales associate tasked with providing support or information to the user 110 regarding the website or online service (e.g., information about products available at an online store). Out of a large number of agents, a subset of agents may be appropriate for providing support or information for a particular client 125. The agent 120 may be affiliated or not affiliated with the client 125. Each agent can be associated with one or more clients 125. In some non-limiting examples, a user 110 can be an individual shopping an online store from a personal computing device, a client 125 can be a company that sells products online, and an agent 120 can be a sales associate employed by the company. In various embodiments, the user 110, client 125, and agent 120 can be other individuals or entities.

While FIG. 1 shows only a single network device 105, terminal device 115, and client device 130, an interaction system 100 can include multiple or many (e.g., tens, hundreds or thousands) of each of one or more of these types of devices. Similarly, while FIG. 1 shows only a single user 110, agent 120, and client 125, an interaction system 100 can include multiple or many of each of one or more of such entities. Thus, it may be necessary to determine which endpoint is to be selected to communicate with a given network device. Further complicating matters, a remote server 140 may also be configured to receive and respond to select communications with network device 105.

A connection management system 150 can facilitate strategic routing of communications. A communication can include a message with content (e.g., defined based on input from an entity, such as typed or spoken input). The communication can also include additional data, such as data about a transmitting device (e.g., an IP address, account identifier, device type and/or operating system); a destination address; an identifier of a client; an identifier of a webpage or webpage element (e.g., a webpage or webpage element being visited when the communication was generated or otherwise associated with the communication) or online history data; a time (e.g., time of day and/or date); and/or destination address. Other information can be included in the communication. In some embodiments, connection management system 150 routes the entire communication to another device. In some embodiments, connection management system 150 modifies the communication or generates a new communication (e.g., based on the initial communication). The new or modified communication can include the message (or processed version thereof), at least some (or all) of the additional data (e.g., about the transmitting device, webpage or online history and/or time) and/or other data identified by connection management system 150 (e.g., account data associated with a particular account identifier or device). The new or modified communication can include other information as well.

Part of strategic-routing facilitation can include establishing, updating and using one or more connections between network device 105 and one or more terminal devices 115. For example, upon receiving a communication from network device 105, connection management system 150 can estimate to which client (if any) the communication corresponds. Upon identifying a client, connection management system 150 can identify a terminal device 115 associated with the client for communication with network device 105. In some embodiments, the identification can include evaluating a profile of each of a plurality of agents (or experts or delegates), each agent (e.g., agent 120) in the plurality of agents being associated with a terminal device (e.g., terminal device 115). The evaluation can relate to a content in a network-device message. The identification of the terminal device 115 can include a technique described, for example, in U.S. application Ser. No. 12/725,799, filed on Mar. 17, 2010, which is hereby incorporated by reference in its entirety for all purposes.

In some embodiments, connection management system 150 can determine whether any connections are established between network device 105 and an endpoint associated with the client (or remote server 140) and, if so, whether such channels are to be used to exchange a series of communications including the communication.

Upon selecting an endpoint to communicate with network device 105, connection management system 150 can establish connections between the network device 105 and the endpoint. In some embodiments, connection management system 150 can transmit a message to the selected endpoint. The message may request an acceptance of a proposed assignment to communicate with a network device 105 or identify that such an assignment has been generated. The message can include information about network device 105 (e.g., IP address, device type, and/or operating system), information about an associated user 110 (e.g., language spoken, duration of having interacted with client, skill level, sentiment, and/or topic preferences), a received communication, code (e.g., a clickable hyperlink) for generating and transmitting a communication to the network device 105, and/or an instruction to generate and transmit a communication to network device 105.

In some embodiments, communications between network device 105 and an endpoint such as a user device can be routed through connection management system 150. Such a configuration can allow connection management system 150 to monitor the communication exchange and to detect issues (e.g., as defined based on rules) such as non-responsiveness of either device or extended latency. Further, such a configuration can facilitate selective or complete storage of communications, which may later be used, for example, to assess a quality of a communication exchange and/or to support learning to update or generate routing rules so as to promote particular post-communication targets. As will be described further herein, such configurations can facilitate management of conversations between user 110 and one or more endpoints.

In some embodiments, connection management system 150 can monitor the communication exchange in real-time and perform automated actions (e.g., rule-based actions, artificial intelligence originated actions, etc.) based on the live communications. For example, when connection management system 150 determines that a communication relates to a particular product, connection management system 150 can automatically transmit an additional message to the endpoint containing additional information about the product (e.g., quantity of products in stock, links to support documents related to the product, or other information about the product or similar products).

In some embodiments, a designated endpoint can communicate with network device 105 without relaying communications through connection management system 150. One or both devices 105, 115 may (or may not) report particular communication metrics or content to connection management system 150 to facilitate communication monitoring and/or data storage.

As mentioned, connection management system 150 may route select communications to a remote server 140. Remote server 140 can be configured to provide information in a predetermined manner. For example, remote server 140 may access defined one or more text passages, voice recording and/or files to transmit in response to a communication. Remote server 140 may select a particular text passage, recording or file based on, for example, an analysis of a received communication (e.g., a semantic or mapping analysis).

Routing and/or other determinations or processing performed at connection management system 150 can be performed based on rules and/or data at least partly defined by or provided by one or more client devices 130. For example, client device 130 may transmit a communication that identifies a prioritization of agents, terminal-device types, and/or topic/skill matching. As another example, client device 130 may identify one or more weights to apply to various variables potentially impacting routing determinations (e.g., language compatibility, predicted response time, device type and capabilities, and/or terminal-device load balancing). It will be appreciated that which terminal devices and/or agents are to be associated with a client may be dynamic. Communications from client device 130 and/or terminal devices 115 may provide information indicating that a given terminal device and/or agent is to be added or removed as one associated with a client. For example, client device 130 can transmit a communication with IP address and an indication as to whether a terminal device with the address is to be added or removed from a list identifying client-associated terminal devices.

Each communication (e.g., between devices, between a device and connection management system 150, between remote server 140 and connection management system 150 or between remote server 140 and a device) can occur over one or more networks 170. Any combination of open or closed networks can be included in the one or more networks 170. Examples of suitable networks include the Internet, a personal area network, a local area network (LAN), a wide area network (WAN), or a wireless local area network (WLAN). Other networks may be suitable as well. The one or more networks 170 can be incorporated entirely within or can include an intranet, an extranet, or a combination thereof. In some embodiments, a network in the one or more networks 170 includes a short-range communication channel, such as a Bluetooth or a Bluetooth Low Energy channel. In one embodiment, communications between two or more systems and/or devices can be achieved by a secure communications protocol, such as secure sockets layer (SSL) or transport layer security (TLS). In addition, data and/or transactional details may be encrypted based on any convenient, known, or to be developed manner, such as, but not limited to, Data Encryption Standard (DES), Triple DES, Rivest-Shamir-Adleman encryption (RSA), Blowfish encryption, Advanced Encryption Standard (AES), CAST-128, CAST-256, Decorrelated Fast Cipher (DFC), Tiny Encryption Algorithm (TEA), eXtended TEA (XTEA), Corrected Block TEA (XXTEA), and/or RC5, etc.

A network device 105, terminal device 115, and/or client device 130 can include, for example, a portable electronic device (e.g., a smart phone, tablet, laptop computer, or smart wearable device) or a non-portable electronic device (e.g., one or more desktop computers, smart appliances, servers, and/or processors). Connection management system 150 can be separately housed from network, terminal, IOT and client devices or may be part of one or more such devices (e.g., via installation of an application on a device). Remote server 140 may be separately housed from each device and connection management system 150 and/or may be part of another device or system. While each device, server and system in FIG. 1 is shown as a single device, it will be appreciated that multiple devices may instead be used. For example, a set of network devices can be used to transmit various communications from a single user, or remote server 140 may include a server stack.

A software agent or application may be installed on and/or executable on a depicted device, system or server. In one instance, the software agent or application is configured such that various depicted elements can act in complementary manners. For example, a software agent on a device can be configured to collect and transmit data about device usage to a separate connection management system, and a software application on the separate connection management system can be configured to receive and process the data.

Figure 2:
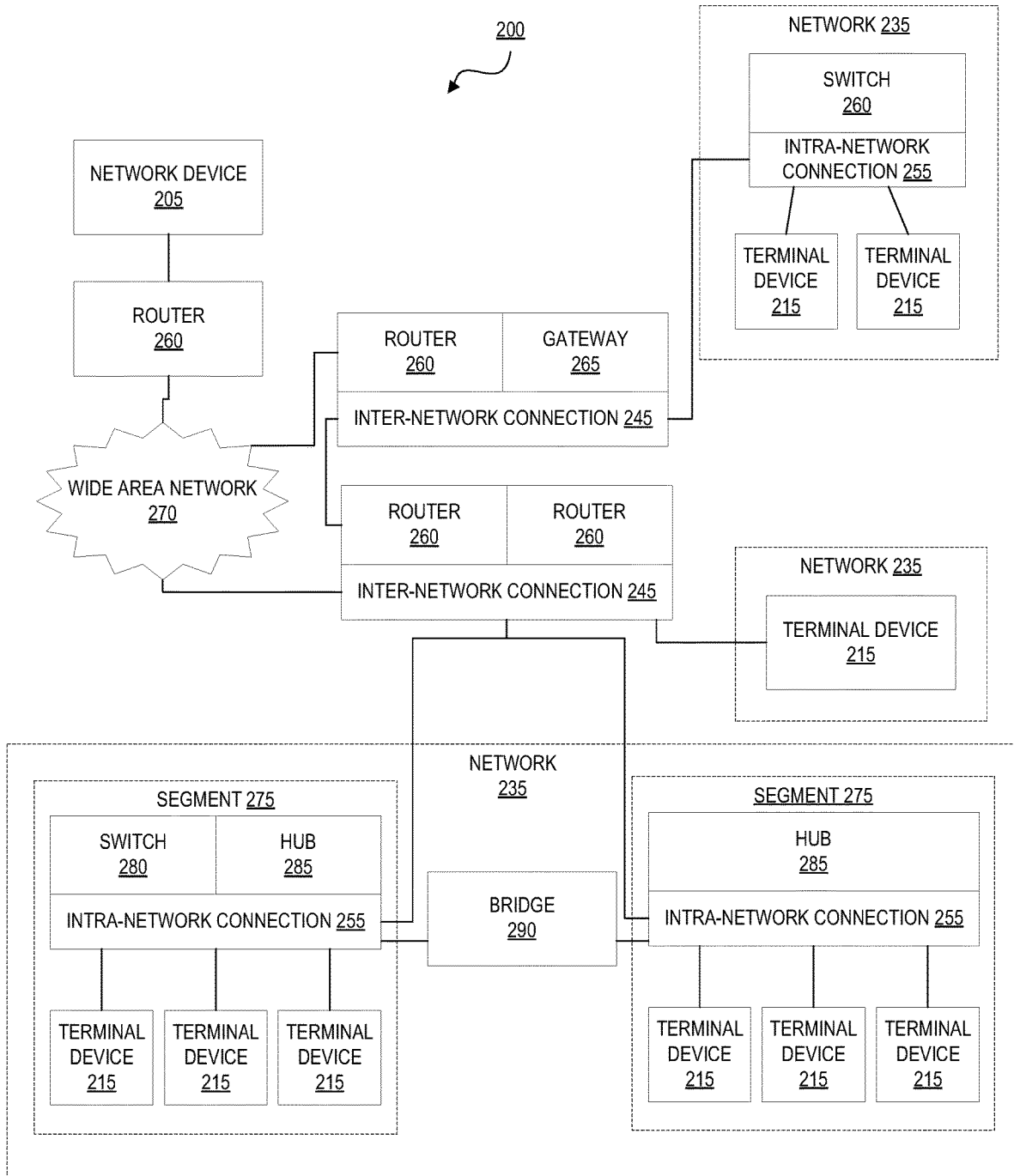
FIG. 2 shows an example embodiment of a network interaction system in accordance with some aspects of the present technology.

FIG. 2 shows a block diagram of another embodiment of a network interaction system 200. Generally, FIG. 2 illustrates a variety of components configured and arranged to enable a network device 205 to communicate with one or more terminal devices 215. The depicted instance includes nine terminal devices 215 included in three local-area networks 235.

In some embodiments, a communication from network device 205 includes destination data (e.g., a destination IP address) that at least partly or entirely indicates which terminal device is to receive the communication. Network interaction system 200 can include one or more inter-network connection components 245 and/or one or more intra-network connection components 255 that can process the destination data and facilitate appropriate routing.

Each inter-network connection components 245 can be connected to a plurality of networks 235 and can have multiple network cards installed (e.g., each card connected to a different network). For example, an inter-network connection component 245 can be connected to a wide-area network 270 (e.g., the Internet) and one or more local-area networks 235. In the depicted instance, in order for a communication to be transmitted from network device 205 to any of the terminal devices, in the depicted system, the communication must be handled by multiple inter-network connection components 245.

When an inter-network connection component 245 receives a communication (or a set of packets corresponding to the communication), inter-network connection component 245 can determine at least part of a route to pass the communication to a network associated with a destination. The route can be determined using, for example, a routing table (e.g., stored at the router), which can include one or more routes that are pre-defined, generated based on an incoming message (e.g., from another router or from another device) or learned.

Examples of inter-network connection components 245 include a router 260 and a gateway 265. An inter-network connection component 245 (e.g., gateway 265) may be configured to convert between network systems or protocols. For example, gateway 265 may facilitate communication between Transmission Control Protocol/Internet Protocol (TCP/IP) and Internetwork Packet Exchange/Sequenced Packet Exchange (IPX/SPX) devices.

Upon receiving a communication at a local-area network 235, further routing may still need to be performed. Such intra-network routing can be performed via an intra-network connection component 255, such as a switch 280 or hub 285. Each intra-network connection component 255 can be connected to (e.g., wirelessly or wired, such as via an Ethernet cable) multiple terminal devices 215. Hub 285 can be configured to repeat all received communications to each device to which it is connected. Each terminal device can then evaluate each communication to determine whether the terminal device is the destination device or whether the communication is to be ignored. Switch 280 can be configured to selectively direct communications to only the destination terminal device.

In some embodiments, a local-area network 235 can be divided into multiple segments, each of which can be associated with independent firewalls, security rules and network protocols. An intra-network connection component 255 can be provided in each of one, more or all segments to facilitate intra-segment routing. A bridge 290 can be configured to route communications across segments 275.

To appropriately route communications across or within networks, various components analyze destination data in the communications. For example, such data can indicate which network a communication is to be routed to, which device within a network a communication is to be routed to or which communications a terminal device is to process (versus ignore). However, In some embodiments, it is not immediately apparent which terminal device (or even which network) is to participate in a communication from a network device.

To illustrate, a set of terminal devices may be configured so as to provide similar types of responsive communications. Thus, it may be expected that a query in a communication from a network device may be responded to in similar manners regardless to which network device the communication is routed. While this assumption may be true at a high level, various details pertaining to terminal devices can give rise to particular routings being advantageous as compared to others. For example, terminal devices in the set may differ from each other with respect to (for example) which communication channels are supported, geographic and/or network proximity to a network device and/or characteristics of associated agents (e.g., knowledge bases, experience, languages spoken, availability, general personality or sentiment, etc.). Accordingly, select routings may facilitate faster responses that more accurately and/or completely respond to a network-device communication. A complication is that static routings mapping network devices to terminal devices may fail to account for variations in communication topics, channel types, agent availability, and so on.

Figure 3A:
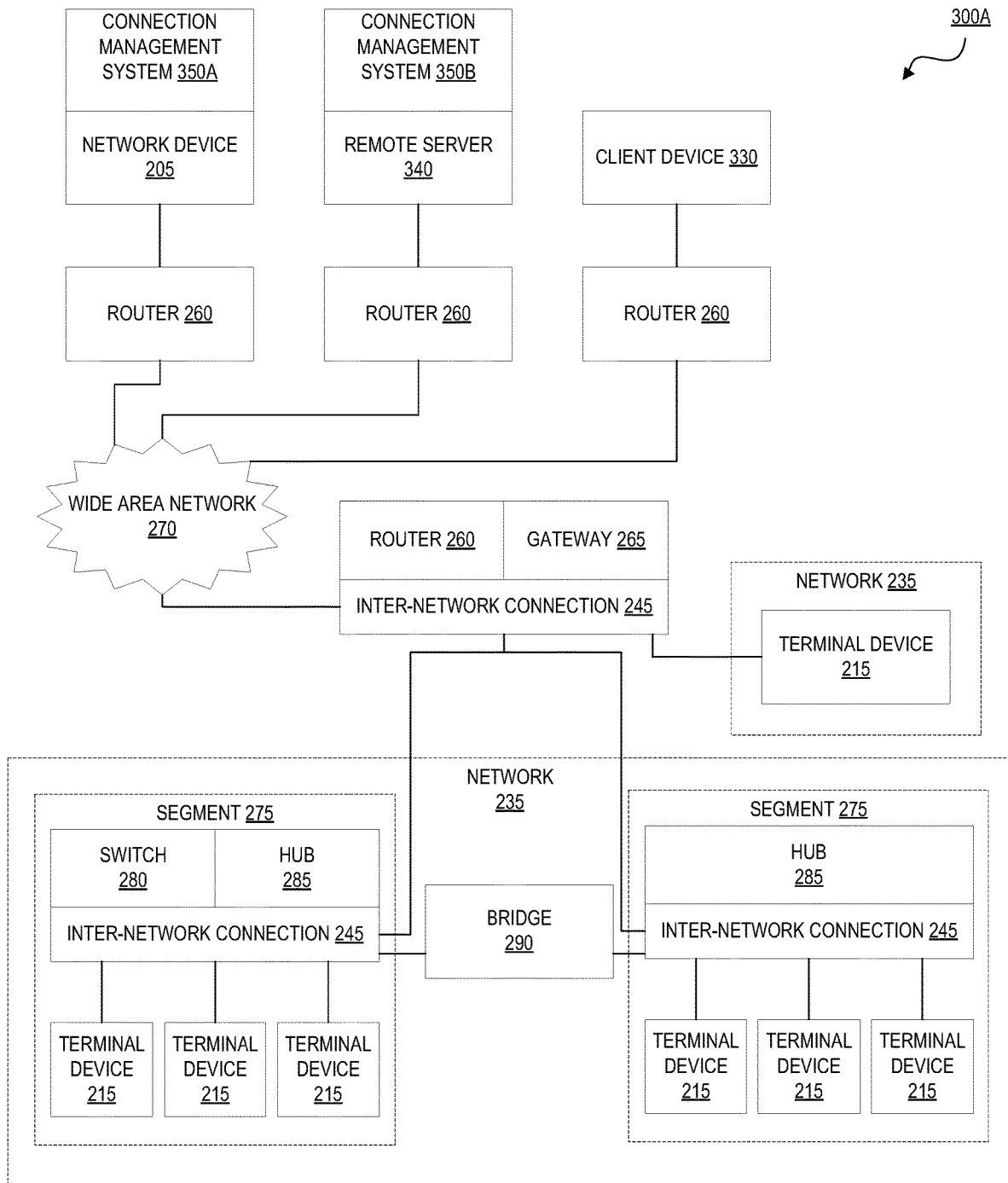
FIGS. 3A, 3B, and 3C show example embodiments of a network interaction system that includes a connection management system in accordance with some aspects of the present technology.
Figure 3B:
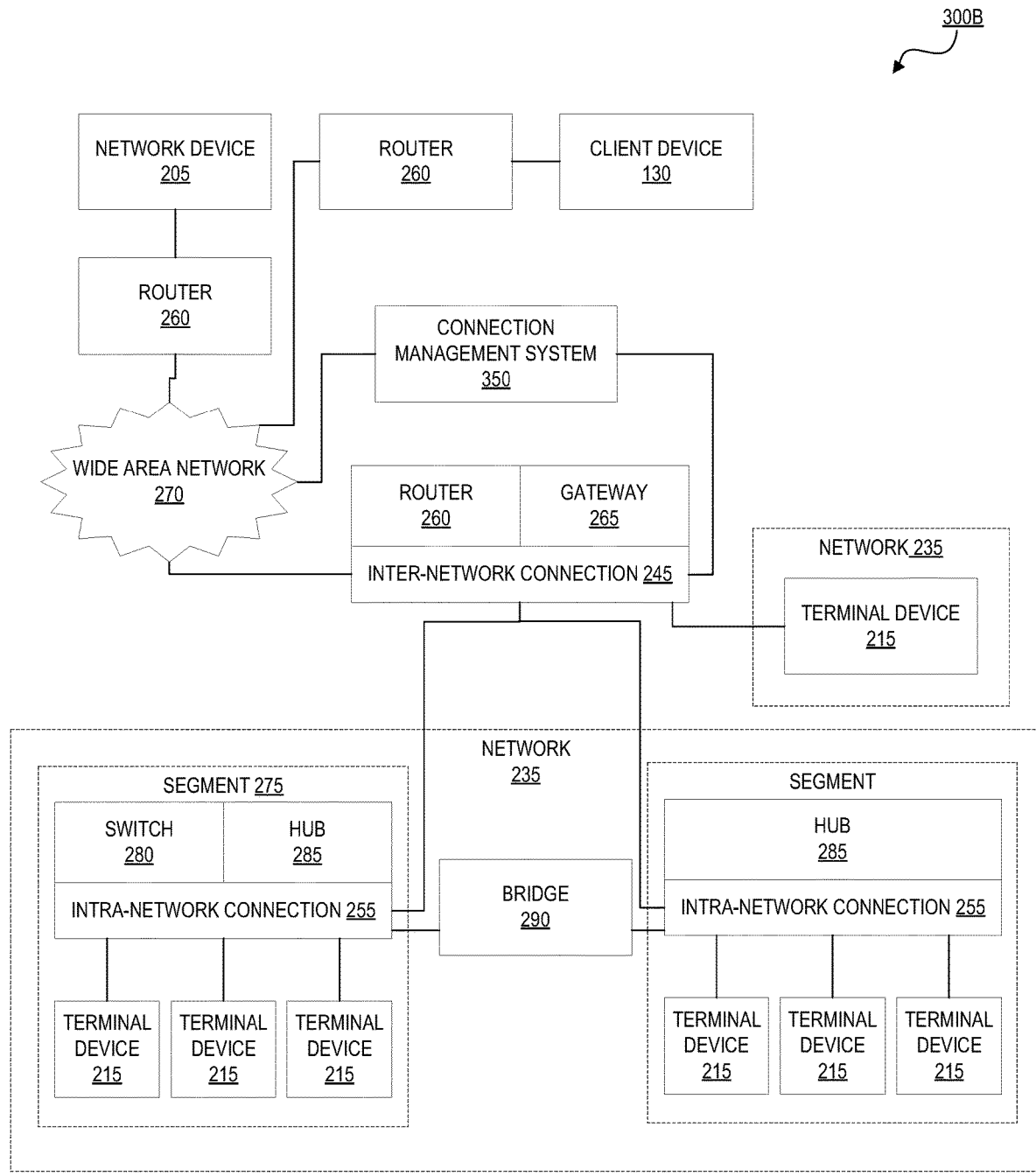
Figure 3C:
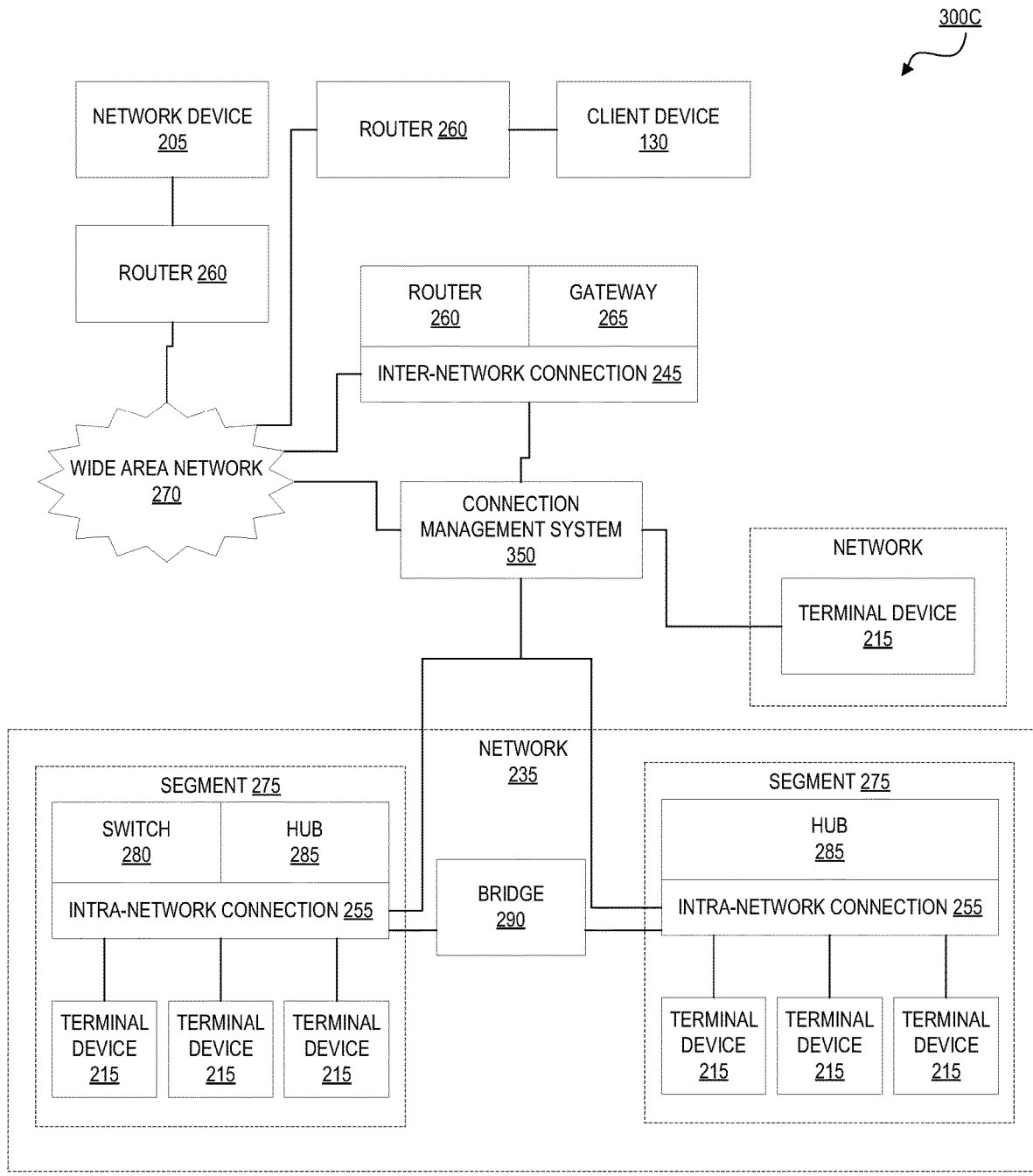

FIGS. 3A, 3B, 3C show block diagrams of other embodiments of a network interaction system 300a, 300b, 300c that includes a connection management system 350, including example connection management systems 350A and 350B. Each of the depicted systems 300a, 300b, 300c show only two local-area networks 235 for simplicity, though it can be appreciated that embodiments can be extended to expand the number of local-area networks. Each of systems 300a, 300b, 300c include a connection management system 150, which can identify which terminal device is to communicate with network device 205, can establish and manage (e.g., maintain or close) connections, can determine whether and when to re-route communications in an exchange, and so on. Thus, connection management system 150 can be configured to dynamically, and in real-time, evaluate communications, agent availability, capabilities of terminal devices or agents, and so on, to influence routing determinations.

In FIG. 3A, connection management system 150 is associated with each of network device 205 and a remote server 340 (e.g., connection management system 150a is associated with network device 205 and connection management system 150b is associated with remote server 340). For example, connection management system 150a and/or connection management system 150b can be installed or stored as an application on each of network device 205 and remote server 340, respectively. Execution of the application(s) can facilitate, for example, a communication between network device 205 and remote server 340 to identify a terminal device 215 selected to participate in a communication exchange with network device 205. The identification can be made based on one or more factors disclosed herein (e.g., availability, matching between a communication's topic/level of detail with agents' or terminal devices' knowledge bases, predicted latency, channel-type availability, and so on).

A client device 330 can provide client data indicating how routing determinations are to be made. For example, such data can include: indications as to how particular characteristics are to be weighted or matched or constraints or biases (e.g., pertaining to load balancing or predicted response latency). Client data can also include specifications related to when communication channels are to be established (or closed) or when communications are to be re-routed to a different network device. Client data can be used to define various client-specific rules, such as rules for communication routing and so on.

Connection management system 150b executing on remote server 340 can monitor various metrics pertaining to terminal devices (e.g., pertaining to a given client), such as which communication channels are supported, geographic and/or network proximity to a network device, communication latency and/or stability with the terminal device, a type of the terminal device, a capability of the terminal device, whether the terminal device (or agent) has communicated with a given network device (or user) before and/or characteristics of associated agents (e.g., knowledge bases, experience, languages spoken, availability, general personality or sentiment, etc.). Accordingly, communication management system 150b may be enabled to select routings to facilitate faster responses that more accurately and/or completely respond to a network-device communication based on the metrics.

In the example depicted in FIG. 3A, a communication exchange between network device 205 and remote server 340 can facilitate early identification of a destination address. Network device 205 may then use the destination address to direct subsequent communications. For example, network device 205 may send an initial communication to remote server 340 (e.g., via one or more inter-network connections and a wide-area network), and remote server 340 may identify one or more corresponding clients. Remote server 340 may then identify a set of terminal devices associated with the one or more corresponding clients and collect metrics for those terminal devices. The metrics can be evaluated (e.g., by remote server 340) so as to select a terminal device to involve in a communication exchange, and information pertaining to the terminal device (e.g., an IP address) can be sent to network device 205. In some embodiments, remote server 340 may continuously or periodically collect and evaluate metrics for various terminal devices and store evaluation results in a data store. In such embodiments, upon identifying a set of terminal devices associated with the one or more corresponding clients, remote server 340 can access the stored evaluation results from the data store and select a terminal device to involve in the communication exchange based on the stored evaluation results.

In FIG. 3B, connection management system 150 can be configured to serve as a relay and/or destination address. Thus, for example, a set of network devices 205 may transmit communications, each identifying connection management system 150 as a destination. Connection management system 150 can receive each communication and can concurrently monitor a set of terminal devices (e.g., so as to generate metrics for each terminal device). Based on the monitoring and a rule, connection management system 150 can identify a terminal device 215 to which it may relay each communication. Depending on the embodiment, terminal device communications may similarly be directed to a consistent destination (e.g., of connection management system 150) for further relaying, or terminal devices may begin communicating directly with corresponding network devices. These embodiments can facilitate efficient routing and thorough communication monitoring.

The embodiment depicted in FIG. 3C is similar to that in FIG. 3B. However, in some embodiments, connection management system 150 is directly connected to intra-network components (e.g., terminal devices, intra-network connections, or other).

It will be appreciated that many variations of FIGS. 3A-3C are contemplated. For example, connection management system 150 may be associated with a connection component (e.g., inter-network connection component 245 or intra-network connection component 255) such that an application corresponding to connection management system 150 (or part thereof) is installed on the component. The application may, for example, perform independently or by communicating with one or more similar or complementary applications (e.g., executing on one or more other components, network devices or remotes servers).

Figure 4:
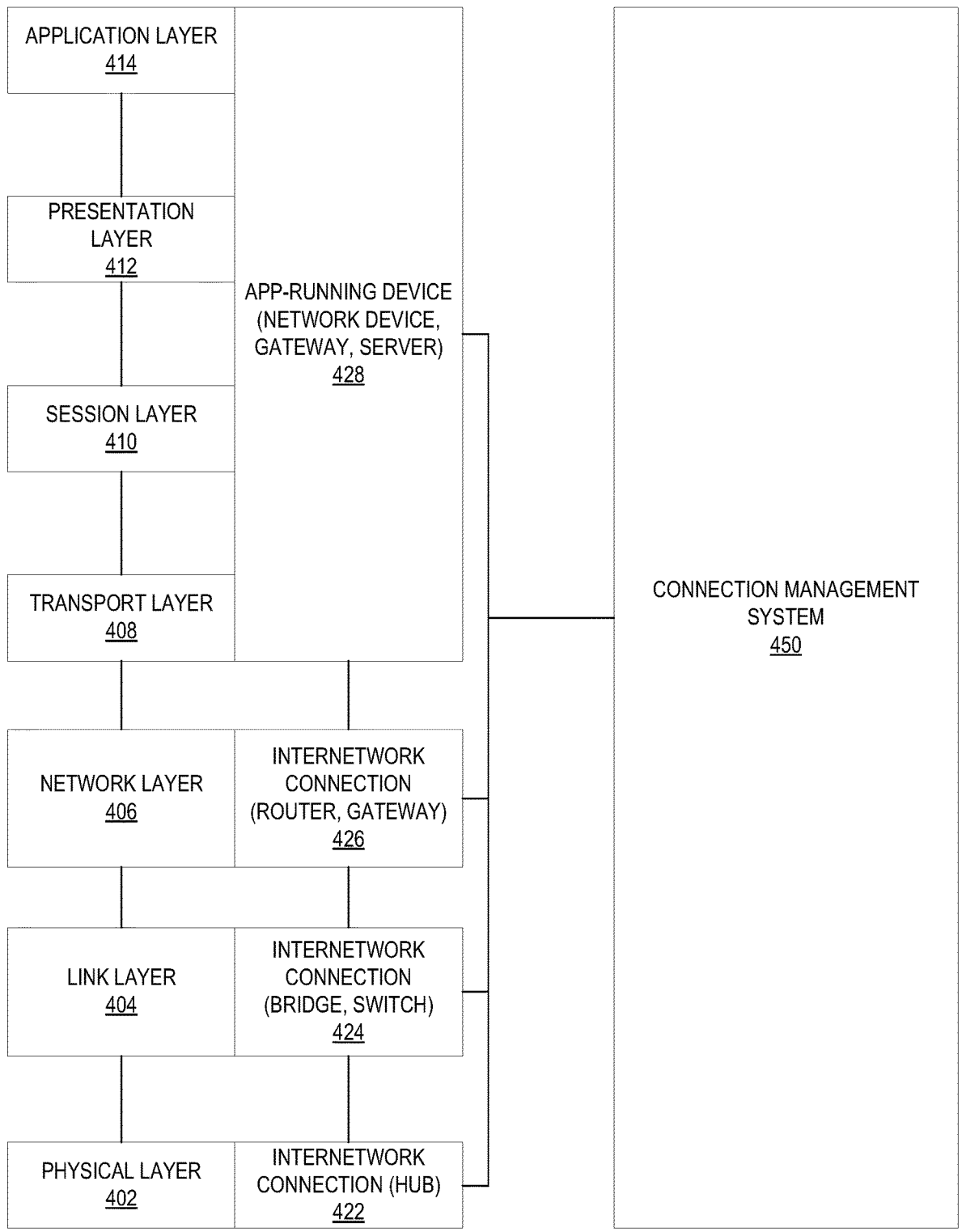
FIG. 4 shows a representation of a protocol-stack mapping of connection components' operation in accordance with some aspects of the present technology.

FIG. 4 shows a representation of a protocol-stack mapping 400 of connection components' operation. More specifically, FIG. 4 identifies a layer of operation in an Open Systems Interaction (OSI) model that corresponds to various connection components.

The OSI model can include multiple logical layers 402-414. The layers are arranged in an ordered stack, such that layers 402-412 each serve a higher level and layers 404-414 is each served by a lower layer. The OSI model includes a physical layer 402. Physical layer 402 can define parameters physical communication (e.g., electrical, optical, or electromagnetic). Physical layer 402 also defines connection management protocols, such as protocols to establish and close connections. Physical layer 402 can further define a flow-control protocol and a transmission mode.

A link layer 404 can manage node-to-node communications. Link layer 404 can detect and correct errors (e.g., transmission errors in the physical layer 402) and manage access permissions. Link layer 404 can include a media access control (MAC) layer and logical link control (LLC) layer.

A network layer 406 can coordinate transferring data (e.g., of variable length) across nodes in a same network (e.g., as datagrams). Network layer 406 can convert a logical network address to a physical machine address.

A transport layer 408 can manage transmission and receipt quality. Transport layer 408 can provide a protocol for transferring data, such as a Transmission Control Protocol (TCP). Transport layer 408 can perform segmentation/desegmentation of data packets for transmission and can detect and account for transmission errors occurring in layers 402, 404,406. A session layer 410 can initiate, maintain and terminate connections between local and remote applications. Sessions may be used as part of remote-procedure interactions. A presentation layer 412 can encrypt, decrypt and format data based on data types known to be accepted by an application or network layer.

An application layer 414 can interact with software applications that control or manage communications. Via such applications, application layer 414 can (for example) identify destinations, local resource states or availability and/or communication content or formatting. Various layers 402, 404, 406, 408, 410, 412414 can perform other functions as available and applicable.

Intra-network connection components 422, 424 are shown to operate in physical layer 402 and link layer 404. More specifically, a hub can operate in the physical layer, such that operations can be controlled with respect to receipts and transmissions of communications. Because hubs lack the ability to address communications or filter data, they possess little to no capability to operate in higher levels. Switches, meanwhile, can operate in link layer 404, as they are capable of filtering communication frames based on addresses (e.g., MAC addresses).

Meanwhile, inter-network connection components 426, 428 are shown to operate on higher levels (e.g., layers 406, 408, 410, 412, 414). For example, routers can filter communication data packets based on addresses (e.g., IP addresses). Routers can forward packets to particular ports based on the address, so as to direct the packets to an appropriate network. Gateways can operate at the network layer and above, perform similar filtering and directing and further translation of data (e.g., across protocols or architectures).

A connection management system 450 can interact with and/or operate on, in various embodiments, one, more, all or any of the various layers. For example, connection management system 450 can interact with a hub so as to dynamically adjust which terminal devices the hub communicates. As another example, connection management system 450 can communicate with a bridge, switch, router or gateway so as to influence which terminal device the component selects as a destination (e.g., MAC, logical or physical) address. By way of further examples, a connection management system 450 can monitor, control, or direct segmentation of data packets on transport layer 408, session duration on session layer 410, and/or encryption and/or compression on presentation layer 412. In some embodiments, connection management system 450 can interact with various layers by exchanging communications with (e.g., sending commands to) equipment operating on a particular layer (e.g., a switch operating on link layer 404), by routing or modifying existing communications (e.g., between a network device and a terminal device) in a particular manner, and/or by generating new communications containing particular information (e.g., new destination addresses) based on the existing communication. Thus, connection management system 450 can influence communication routing and channel establishment (or maintenance or termination) via interaction with a variety of devices and/or via influencing operating at a variety of protocol-stack layers.

Figure 5:
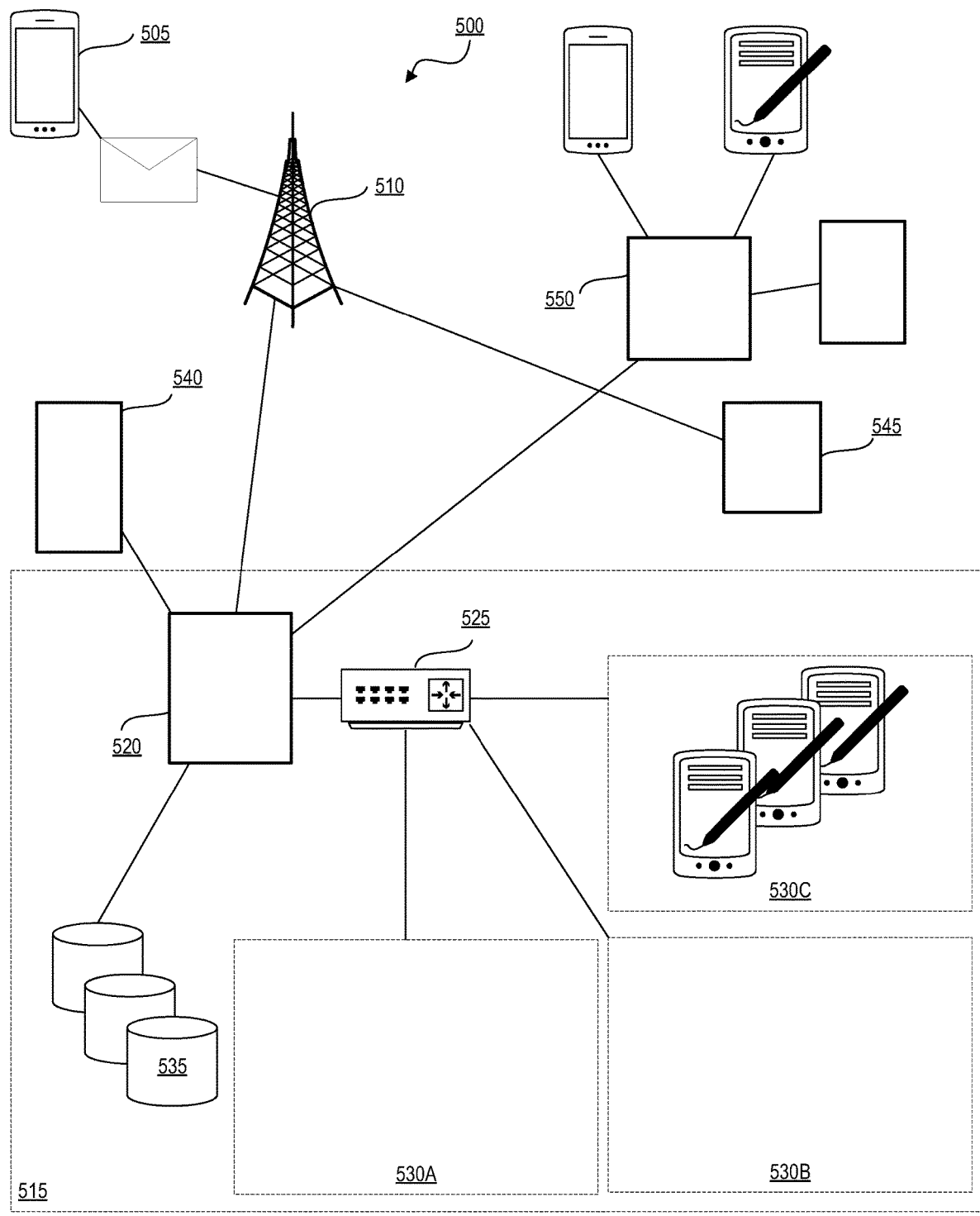
FIG. 5 represents a multi-device communication exchange system embodiment in accordance with some aspects of the present technology.

FIG. 5 represents a multi-device communication exchange system 500 according to an embodiment. System 500 includes a network device 505 configured to communicate with a variety of types of endpoints over a variety of types of communication channels.

In the depicted instance, network device 505 can transmit a communication over a cellular network (e.g., via a base station 510). The communication can be routed to an operative network 515. Operative network 515 can include a connection management system 150 that receives the communication and identifies which endpoint is to respond to the communication.

Such determination can depend on identifying a client to which that communication pertains (e.g., based on a content analysis or user input indicative of the client) and determining one or more metrics for each of one or more endpoints associated with the client. For example, in FIG. 5, each cluster of endpoints 530a, 530b, and 530c can correspond to a different client. The endpoints may be geographically co-located or disperse. The metrics may be determined based on stored or learned data and/or real-time monitoring (e.g., based on availability).

Connection management system 520 can communicate with various endpoints via one or more routers 525 or other inter-network or intra-network connection components. Connection management system 520 may collect, analyze and/or store data from or pertaining to communications, terminal-device operations, client rules, and/or user-associated actions (e.g., online activity, account data, purchase history, etc.) at one or more data stores. Such data may influence communication routing.

Notably, various other devices can further be used to influence communication routing and/or processing. For example, in the depicted instance, connection management system 520 also is connected to a web server 540 and database(s) 535. Thus, connection management system 520 can retrieve data of interest, such as technical product details, news, current product offerings, current or predicted weather, and so on.

Network device 505 may also be connected to a web server (e.g., including a streaming web server 545). In some embodiments, communication with such a server provided an initial option to initiate a communication exchange with connection management system 150. For example, network device 505 may detect that, while visiting a particular webpage, a communication opportunity is available and such an option can be presented.

In some embodiments, one or more elements of communication system 500 can also be connected to a social-networking server 550. Social networking server 550 can aggregate data received from a variety of user devices. Thus, for example, connection management system 150 may be able to estimate a general (or user-specific) intent towards a given topic or estimate a general behavior of a given user or class of users. Social networking server 550 can also maintain a social graphs for one or more users. A social graph can consist of first level connections (direct connections) of a social user, and additional levels of connections (indirect connections through the user's direct connections).

Figure 6:
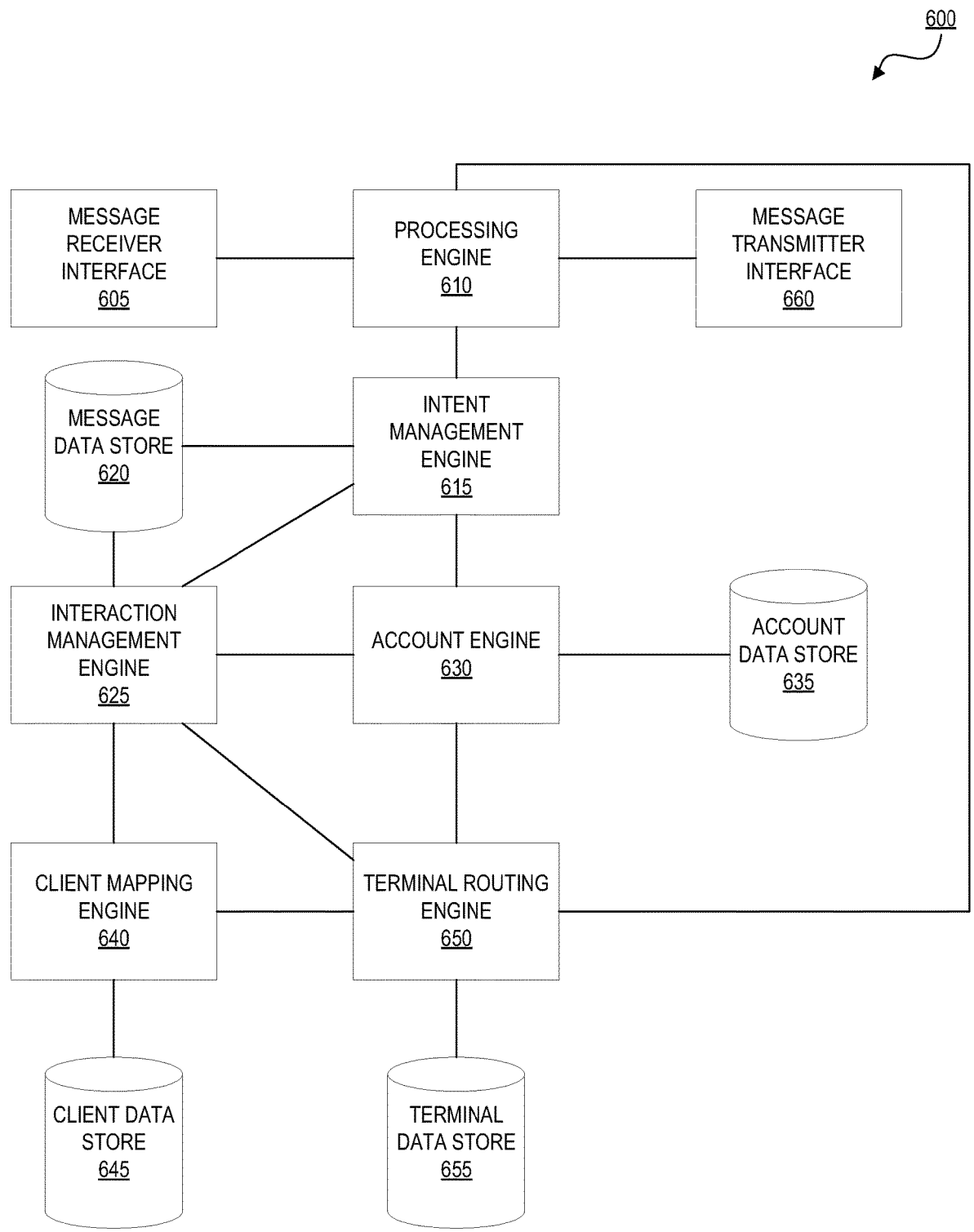
FIG. 6 shows an example embodiment of a connection management system in accordance with some aspects of the present technology.

FIG. 6 shows a block diagram of an embodiment of a connection management system 600. Connection management system 600 can, in some examples, be used as connection management system 150, 520, or any other such connection management system. A message receiver interface 605 can receive a message. In some embodiments, the message can be received, for example, as part of a communication transmitted by a source device (e.g., housed separately from connection management system 150 or within a same housing), such as a network device or endpoint. In some embodiments, the communication can be part of a series of communications or a communicate exchange, which can include a series of messages or communication exchange being routed between two devices (e.g., a network device and endpoint). This message or communication exchange may be part of and/or may define an interaction between the devices. A communication channel or operative channel can include one or more protocols (e.g., routing protocols, task-assigning protocols and/or addressing protocols) used to facilitate routing and a communication exchange between the devices.

In some embodiments, the message can include a message generated based on inputs received at an user interface. For example, the message can include a message that was generated based on button or key presses or recorded speech signals, or speech to text software. In one instance, the message includes an automatically generated message, such as one generated upon detecting that a network device is presenting a particular app page or webpage or has provided a particular input command (e.g., key sequence). The message can include an instruction or request, such as one to initiate a communication exchange.

In some embodiments, the message can be a natural language communication, whether spoken or typed. A natural language communication, as used herein, refers to ordinary use of a language used to communicate amongst humans, and is contrasted with use of language defined by a protocol required for communicating with a specific virtual assistant or artificial intelligence tool. A natural language communication should not require constraints such as the use of a wake word to alert an artificial intelligence tool that a communication is addressed to the artificial intelligence. Additionally, a natural language communication should not require the user to identify particular key words, specific phrases, or explicitly name a service in order to understand how to service the communication. In some embodiments, natural language may include emoticons and other forms of modern communication.

While the present technology utilizes natural language communications, the communications can identify particular key words, specific phrases, or explicitly name a service. For example, the message can include or be associated with an identifier of a client. For example, the message can explicitly identify the client (or a device associated with the client); the message can include or be associated with a webpage or app associated with the client; the message can include or be associated with a destination address associated with a client; or the message can include or be associated with an identification of an item (e.g., product) or service associated with the client (e.g., being offered for sale by the client, having been sold by the client or being one that the client services). To illustrate, a network device may be presenting an app page of a particular client, which may offer an option to transmit a communication to an agent. Upon receiving user input corresponding to a message, a communication may be generated to include the message and an identifier of the particular client.

A processing engine 610 may process a received communication and/or message. Processing can include, for example, extracting one or more particular data elements (e.g., a message, a client identifier, a network-device identifier, an account identifier, and so on). Processing can include transforming a formatting or communication type (e.g., to be compatible with a particular device type, operating system, communication-channel type, protocol and/or network).

An intent management engine 615 may assess the (e.g., extracted or received) message. This message can be accessed from a message data store 620, which manages messages received by interface 605 and assessed by intent management engine 615. The assessment can include identifying, for example, one or more intents for the message. Examples of intents can include (for example) topic, sentiment, complexity, and urgency. A topic can include, but it not limited to, a subject, a product, a service, a technical issue, a use question, a complaint, a refund request or a purchase request, etc. An intent can be determined, for example, based on a semantic analysis of a message (e.g., by identifying keywords, sentence structures, repeated words, punctuation characters and/or non-article words); user input (e.g., having selected one or more categories); and/or message-associated statistics (e.g., typing speed and/or response latency). Aspects of intent management engine 615 can use machine learning to generate and revise systems for associating incoming communications (e.g. text) from a user with an intent category. For example, machine learning models can use previous data and results of associations between words and phrases in incoming communications as well as natural language data from current and historical communications to generate and update associations between words and intent categories. This can be done with any combination of supervised learning with constructed data sets and historical data, unsupervised learning based on expectation or projection models for current routing paths in a system and system use targets. Any such data can be used in operations for natural language processing (e.g. natural language understanding, natural language inference, etc.) to generate natural language data or to update machine learning models. Such data can then be used by the client systems or shared with applications running on a network device or on a server to improve dynamic message processing (e.g. improved intent indicator data results or response message generation). In some examples, convolutional neural networks can be used with sets of incoming words and phrases along with output intent categories. Such a neural network can be trained with input words and phrases and output correlations to intent categories. Real-time system operations can then use instances of such a neural network to generate data on associations between incoming user communications and words in a user communication and intent categories in a system. Based on the outputs of such a neural network, an intent category can be assigned to a user or user account involved in a communication, and associated actions can be assigned. In some implementations, the neural network settings can be modified with real-time dynamic feedback from usage to shift associations between words in user communications and intent categories and actions selected based on these words. These selections can be probabilistic, and so the AI and machine learning systems can automatically track shifts in user expectations by integrating user feedback and usage data to improve system performance. For example, when a user is directed to an endpoint action for a particular intent category or subcategory, the user can provide a feedback communication indicating that the user is looking for a different action. This can be used as real-time feedback in a system to shift the probabilities and annotations associated with future intent category assignments.

In some embodiments, an intent can be clarified by engaging user 110 in a conversation that can include clarifying questions, or simply requesting additional information. Just as above, various machine learning and AI systems can be used to generate and update systems for responding to a user. For example, in some systems, each intent category and sub-category can have a different associated convolutional neural network. In some examples, an action taken in response to processing words from a user is to associate an intent category and a neural network for the intent category to a communication with a user, and to process the user communications using the assigned neural network. As described herein, multiple different neural networks can be used in the course of a conversation (e.g. multiple back and forth communications between a user and a system), and data for such communications can be used in machine learning operations to update the neural networks or other systems used for future interactions with users and operations to associate intent categories and actions with words from a user communication. Usage data by users can be used to adjust weights in a neural network to improve intent category assignments and track changes in user intent trends (e.g. final user intent results identified at the end of a user conversation with a system as compared with assigned intents based on initial user communications). Data generated by intent management engine 615 can be stored with associated message data in message data store 620, and this data can be used for various updates, including managing data for continuous real-time analysis updates or other dynamic feedback and modifications to a system, as described herein.

An interaction management engine 625 can determine to which endpoint a communication is to be routed and how the receiving and transmitting devices are to communicate. Each of these determinations can depend, for example, on whether a particular network device (or any network device associated with a particular user) has previously communicated with an endpoint in a set of endpoints (e.g., any endpoint associated with connection management system 150 or any endpoint associated with one or more particular clients). In some examples, an interaction management engine 625 is invoked as an action to route a user communication to a different endpoint based on intent categories assigned to a user communication. This can involve updates to an endpoint (e.g. a particular agent or AI resource) being used during a conversation with a user.

In some embodiments, when a network device (or other network device associated with a same user or account) has previously communicated with a given endpoint (e.g., communications with a particular agent or AI system about matters relating to a particular topic or system client or business), communication routing can be generally biased towards the same endpoint. Other factors that may influence routing can include, for example, an inferred or identified user or agent sentiment pertaining to the previous communication; a topic of a present communication (e.g., and an extent to which that relates to a topic of a previous communication and/or a knowledge base associated with one or more endpoints); whether the endpoint is available; and/or a predicted response latency of the endpoint. Such factors may be considered absolutely or relative to similar metrics corresponding to other endpoints. A re-routing rule (e.g., a client-specific or general rule) can indicate how such factors are to be assessed and weighted to determine whether to forego agent consistency. Just as above for intent category assignment, AI analysis can be used to determine re-routing rules in a system. For example, when history data processed by machine learning systems identify no correlation between certain types of user communications and certain re-routing operations, such re-routing operations can be discontinued. By contrast, when such machine learning analysis identifies positive results correlated with re-routing rules, such rules can be emphasized or strengthen, to prioritize re-routing (e.g. dedicating additional systems to re-routing, prioritizing re-routing options in agent assignments, etc.)

When a network device (or other network device associated with a same user or account) has not previously communicated with a given endpoint (e.g., about matters relating to a client), an endpoint selection can be performed based on factors such as, for example, an extent to which various agents' knowledge base corresponds to a communication topic, availability of various agents at a given time and/or over a channel type, types and/or capabilities of endpoints, a language match between a user and agents, and/or a personality analyses. In one instance, a rule can identify how to determine a sub-score to one or more factors such as these and a weight to assign to each score. By combining (e.g., summing) weighted sub-scores, a score for each agent can be determined. An endpoint selection can then be made by comparing endpoints' scores (e.g., to select a high or highest score).

With regard to determining how devices are to communicate, interaction management engine 625 can (for example) determine whether an endpoint is to respond to a communication via (for example) email, online chat, SMS message, voice call, video chat, etc. A communication type can be selected based on, for example, a communication-type priority list (e.g., at least partly defined by a client or user); a type of a communication previously received from the network device (e.g., so as to promote consistency), a complexity of a received message, capabilities of the network device, and/or an availability of one or more endpoints. Appreciably, some communication types will result in real-time communication (e.g., where fast message response is expected), while others can result in asynchronous communication (e.g., where delays (e.g., of several minutes or hours) between messages are acceptable).

In some embodiments, the communication type can be a text messaging or chat application. These communication technologies provide the benefit that no new software needs to be downloaded and executed on users' network devices. In some examples, the communication type can be a voice communication type. In such examples, voice to text systems can be used to process voice communications into words to be analyzed by example systems described herein. In some examples, words analyzed by a system can include words represented by audio data. Thus, as described herein, words can be represented by combinations of symbols stored in memory (e.g. American Standard Code for Information Interchange (ASCII) data) or can be represented by audio data (e.g. data representing sound combinations)

Further, interaction management engine 625 can determine whether a continuous channel between two devices (e.g. for a conversation or repeated transmissions between a user device and a system) should be established, used or terminated. A continuous channel can be structured so as to facilitate routing of future communications from a network device to a specified endpoint. This bias can persist even across message series (e.g., days, weeks or months). In some embodiments, a representation of a continuous channel (e.g., identifying an agent) can be included in a presentation to be presented on a network device. In this manner, a user can understand that communications are to be consistently routed so as to promote efficiency.

In one instance, a score can be generated using one or more factors described herein and a rule (e.g., that includes a weight for each of the one or more factors) to determine a connection score corresponding to a given network device and endpoint. The score may pertain to an overall match or one specific to a given communication or communication series. Thus, for example, the score may reflect a degree to which a given endpoint is predicted to be suited to respond to a network-device communication. In some embodiments, a score analysis can be used to identify each of an endpoint to route a given communication to and whether to establish, use or terminate a connection. When a score analysis is used to both address a routing decision and a channel decision, a score relevant to each decision may be determined in a same, similar or different manner.

Thus, for example, it will be appreciated that different factors may be considered depending on whether the score is to predict a strength of a long-term match versus one to respond to a particular message query. For example, in the former instance, considerations of overall schedules and time zones may be important, while in the latter instance, immediate availability may be more highly weighted. A score can be determined for a single network-device/terminal-device combination, or multiple scores can be determined, each characterizing a match between a given network device and a different endpoint.

To illustrate, a set of three endpoints associated with a client may be evaluated for potential communication routing. A score may be generated for each that pertains to a match for the particular communication. Each of the first two endpoints may have previously communicated with a network device having transmitted the communication. An input from the network device may have indicated satisfaction with an interaction with the communication(s) with the first device. Thus, a past-interact sub-score (as calculated according to a rule) for the first, second and third devices may be 10, 5, and 0, respectively. (Negative satisfaction inputs may result in negative sub-scores.) It may be determined that only the third endpoint is immediately available. It may be predicted that the second endpoint will be available for responding within 15 minutes, but that the first endpoint will not be available for responding until the next day. Thus, a fast-response sub-score for the first, second and third devices may be 1, 3 and 10. Finally, it may be estimated a degree to which an agent (associated with the endpoint) is knowledgeable about a topic in the communication. It may be determined that an agent associated with the third endpoint is more knowledgeable than those associated with the other two devices, resulting in sub-scores of 3, 4 and 9. In this example, the rule does not include weighting or normalization parameters (though, in other instances, a rule may), resulting in scores of 14, 11 and 19. Thus, the rule may indicate that the message is to be routed to a device with the highest score, that being the third endpoint. If routing to a particular endpoint is unsuccessful, the message can be routed to a device with the next-highest score, and so on.

A score may be compared to one or more absolute or relative thresholds. For example, scores for a set of endpoints can be compared to each other to identify a high score to select an endpoint to which a communication can be routed. As another example, a score (e.g., a high score) can be compared to one or more absolute thresholds to determine whether to establish a continuous channel with an endpoint. An overall threshold for establishing a continuous channel may (but need not) be higher than a threshold for consistently routing communications in a given series of messages. This difference between the overall threshold and threshold for determining whether to consistently route communication may be because a strong match is important in the continuous-channel context given the extended utility of the channel. In some embodiments, an overall threshold for using a continuous channel may (but need not) be lower than a threshold for establishing a continuous channel and/or for consistently routing communications in a given series of messages.

Interaction management engine 625 can interact with an account engine 630 in various contexts. For example, account engine 630 may look up an identifier of a network device or endpoint in an account data store 635 to identify an account corresponding to the device. Further, account engine 630 can maintain data about previous communication exchanges (e.g., times, involved other device(s), channel type, resolution stage, topic(s) and/or associated client identifier), communication channels (e.g., indicating—for each of one or more clients—whether any channels exist, an endpoint associated with each channel, an establishment time, a usage frequency, a date of last use, any channel constraints and/or supported types of communication), user or agent preferences or constraints (e.g., related to terminal-device selection, response latency, terminal-device consistency, agent expertise, and/or communication-type preference or constraint), and/or user or agent characteristics (e.g., age, language(s) spoken or preferred, geographical location, interests, and so on).

Further, interaction management engine 625 can alert account engine 630 of various connection-channel actions, such that account data store 635 can be updated to reflect the current channel data. For example, upon establishing a channel, interaction management engine 625 can notify account engine 630 of the establishment and identify one or more of: a network device, an endpoint, an account and a client. Account engine 630 can subsequently notify a user of the channel's existence such that the user can be aware of the agent consistency being availed.

Interaction management engine 625 can further interact with a client mapping engine 640, which can map a communication to one or more clients (and/or associated brands). In some embodiments, a communication received from a network device itself includes an identifier corresponding to a client (e.g., an identifier of a client, product, service, webpage, or app page). The identifier can be included as part of a message (e.g., which client mapping engine 640 may detect) or included as other data in a message-inclusive communication. Client mapping engine 640 may then look up the identifier in a client data store 645 to retrieve additional data about the client and/or an identifier of the client.

In some embodiments, a message may not particularly correspond to any client. For example, a message may include a general query. Client mapping engine 640 may, for example, perform a semantic analysis on the message, identify one or more keywords and identify one or more clients associated with the keyword(s). In some embodiments, a single client is identified. In some embodiments, multiple clients are identified. An identification of each client may then be presented via a network device such that a user can select a client to communicate with (e.g., via an associated endpoint).

Client data store 645 can include identifications of one or more endpoints (and/or agents) associated with the client. A terminal routing engine 650 can retrieve or collect data pertaining to each of one, more or all such endpoints (and/or agents) so as to influence routing determinations. For example, terminal routing engine 650 may maintain an endpoint data store 655, which can store information such as endpoints' device types, operating system, communication-type capabilities, installed applications accessories, geographic location and/or identifiers (e.g., IP addresses). Information can also include agent information, such as experience level, position, skill level, knowledge bases (e.g., topics that the agent is knowledgeable about and/or a level of knowledge for various topics), personality metrics, working hours, language(s) spoken and/or demographic information. Some information can be dynamically updated. For example, information indicating whether an endpoint is available may be dynamically updated based on (for example) a communication from an endpoint (e.g., identifying whether the device is asleep, being turned off/on, idle/active, or identifying whether input has been received within a time period); a communication routing (e.g., indicative of whether an endpoint is involved in or being assigned to be part of a communication exchange); or a communication from a network device or endpoint indicating that a communication exchange has ended or begun.

It will be appreciated that, in various contexts, being engaged in one or more communication exchanges does not necessarily indicate that an endpoint is not available to engage in another communication exchange. Various factors, such as communication types (e.g., text, message, email, chat, phone), client-identified or user-identified target response times, and/or system loads (e.g., generally or with respect to a user) may influence how many exchanges an endpoint may be involved in.

When interaction management engine 625 has identified an endpoint to involve in a communication exchange or connection, it can notify terminal routing engine 650, which may retrieve any pertinent data about the endpoint from endpoint data store 655, such as a destination (e.g., IP) address, device type, protocol, etc. Processing engine 610 can then modify the message-inclusive communication or generate a new communication (including the message) so as to have a particular format, comply with a particular protocol, and so on. In some embodiments, a new or modified message may include additional data, such as account data corresponding to a network device, a message chronicle, and/or client data.

A message transmitter interface 660 can then transmit the communication to the endpoint. The transmission may include, for example, a wired or wireless transmission to a device housed in a separate housing. The endpoint can include an endpoint in a same or different network (e.g., local-area network) as connection management system 150. Accordingly, transmitting the communication to the endpoint can include transmitting the communication to an inter- or intra-network connection component.

Figure 7:
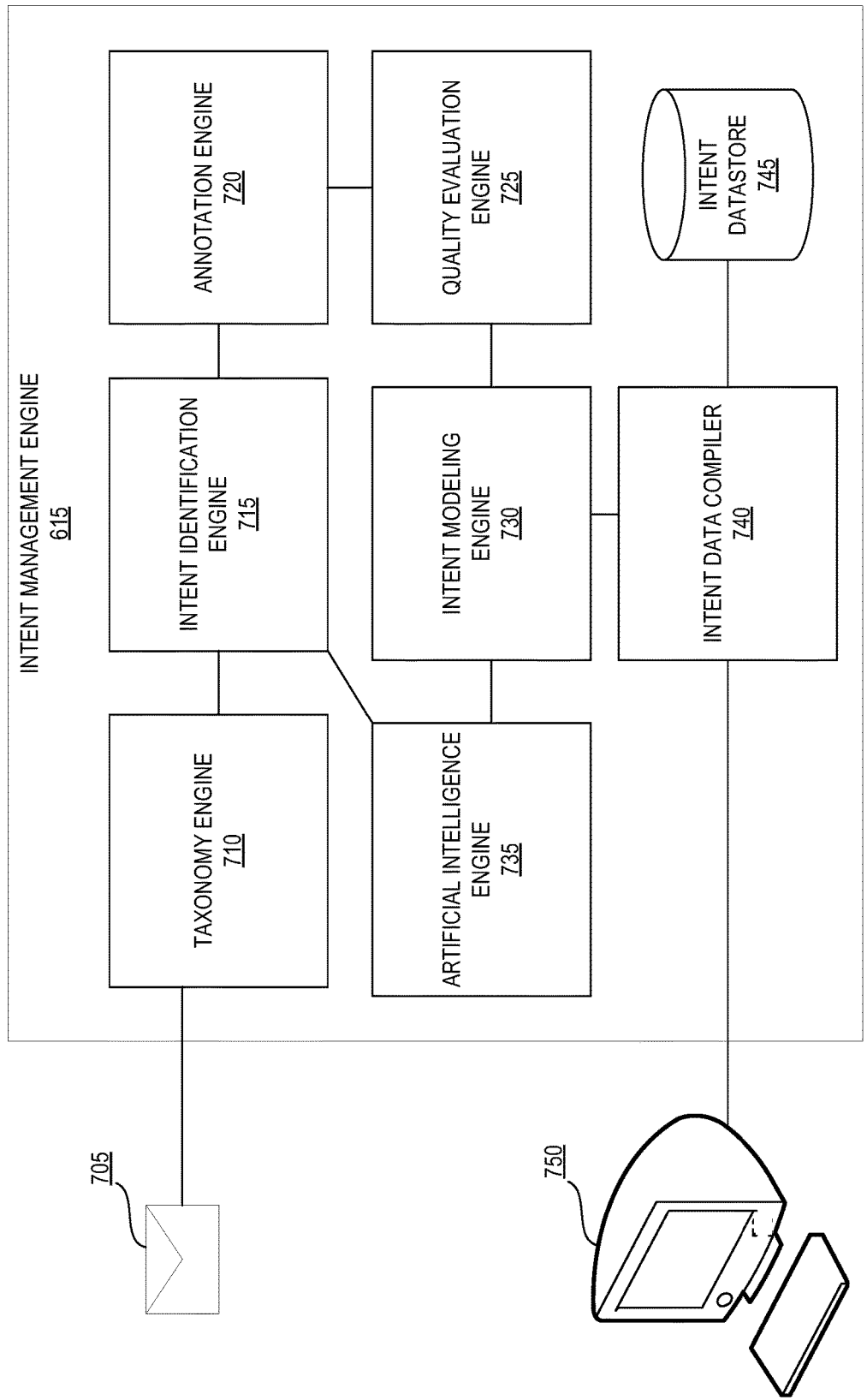
FIG. 7 shows an example embodiment of an intent management engine in accordance with some aspects of the present technology.

FIG. 7 shows an example embodiment of an intent management engine 615 in accordance with some aspects of the present technology. The intent management engine 615 may receive a communication 705 or access such a communication from a message data store 620. The communication 705 may be processed by a taxonomy engine 710, an intent identification engine 715, an annotation engine 720, a quality evaluation engine 725, an intent modeling engine 730, an artificial intelligence engine 735, and an intent data compiler 740. The resulting compiled data may be provided to an interface of a computing device 750, such as a network device, a client device, and/or a terminal device for analysis and/or manipulation, as described further herein.

Communication 705 may be provided to a taxonomy engine 710. Communication 705 may be in natural language as described herein and may include one or more words. In some embodiments, communication 705 can include words in different languages, words embodied as pictograms or emoticons, or strings of characters or images associated with intent categories regardless of standard meanings or dictionary meanings. In some examples, words can be received in communication 705 as audio data. Taxonomy engine may be configured to, in conjunction with a processor, parse the communication 705 to identify one or more key words, also referred to herein as "operative words". The operative words may be related to an action available to a user initiating the communication 705. For example, communication 705 may state, "I want to pay my bill." The operative words may be "pay bill". The taxonomy engine 710 may pass the operative words to the intent identification engine.

The intent identification engine 715 may, in conjunction with a processor, receive the operative words from the taxonomy engine 710. The intent identification engine 715 may use the operative words to identify an intent. Example intents include "pay_bill", "change_address", "speak_to-_representative", "change_due_date", "product_information", "make_a_reservation", "make_a_purchase", and the like. The intent may define the action available to the user originating the communication 705. In some embodiments, the intents may be predefined and stored in an intent datastore 745. In such embodiments, the intent identification engine 715 may query the intent datastore 745 with the operative words to locate a corresponding predefined intent. For example, the intent identification engine 715 may query the intent datastore 745 with the words "pay bill" to identify a closest matching intent of "pay_current_bill". In some embodiments, the operative words may not correspond to an existing intent. In such embodiments, the intent identification engine 715 can create a new intent and save it to the intent datastore 745 in correlation with the operative words received. The intent identification engine 715 may pass the identified intent to the annotation engine 720.

In another example, the intent identification engine can be implemented with AI processors, neural networks, or other systems for analyzing the communication or portions of communication 705. This can include natural language processing to select an intent value associated with a message from a client device. For example, if client device were to text "appointments" word could be processed to identify an intent category for scheduling using intent identification engine 715. Such intent categories can further include actions or subcategories such as action options to see all appointments, cancel appointments, reschedule appointments, or other such values. Using the intent identification engine, the text "appointments" can be processed to select a response associated with an intent value. In one example, a machine learning model of intent identification engine 715 can determine that receiving a response message associated with an intent value of seeing all appointments corresponds most closely with the intent indicator data "appointments", and respond with a message to clarify the intent category. For example, the responsive action can be a message with the content "see all appointsments?" By contrast, a new message from a client device with "new appointment", "cx apptmt", "apt?", "nxt apt", "apt time?", or "cng apt time?" could each result in intent identification engine 715 providing a different response based on a different intent value determined from the words identified from the message.

An intent identification system can use words from a message as operative words or inputs to an AI analysis to identify an intent category. The words operate as intent data that can be and aggregated with history data, user profile data, or any such source for a user to customize an intent analysis and select an intent category for a communication from a user device. One example can include natural language text from a customer indicating an attempt to move money between a main account and a new flex account that has opened and that is associated with the customer. The intent processing system can evaluate the words in the user communication to determine the issue that the customer wishes to have addressed. In this particular instance, the customer may be having trouble transferring funds from one online account to another account. Based on the provided words, the intent identification engine 715 may gather data from multiple sources to determine which intent categories, subcategories, and associated actions to use in response to a user communication. In some examples, context data can be used in addition to the words of the user message. This context data can include intent or action values associated with a context that the request or issue is shared in, a level of urgency, a stress or anxiety level of the customer, whether there is a time pressure, and the like.

In one example, based on an identified intent category, an intent identification engine 715 selects an artificial intelligence engine 735 based on an identified intent category. This particular artificial intelligence engine 735 can be selected from multiple different AI engine options. For example, different intent categories or groups of categories can be associated with different AI engines, including AI engine 735. AI engine 735 is associated with an intent category in order to resolve the issue or request provided by the customer that is associated with the identified intent category. For example, based on the intent category identified from a user communication, a system can determine that accounts have to be authorized before customers can transfer funds into them. Further, the system can determine that authorizing an account can be performed online. Based on the identified process, the intent identification engine 715 selects an AI engine 735 that facilitates actions for responding to the customer intent in a manner that would not only resolve the intent but do so in a manner that leads to a positive customer experience. This can include directing the customer to a client customer service node, or assisting with establishing a connection channel with such a node. In addition to AI engine 735 selected routing paths, a system can generate customized natural language communications associated with the customized routing paths based on the data (e.g. intent indicator data, action data, user demographic data, etc.) This can include customized language and terminology for a user (e.g. "I see the issue") to provide information customized to the user as an action in response to the user communication and the intent category identified by intent identification engine 715. Such systems improve the operation of the devices and communication systems by reducing the system resources used by individual users to reach an appropriate resolution, and to improve communication efficiency.

In some examples, a machine learning model of intent modeling engine 730 can use a feedback system that monitors communications between a network device (e.g. customer) and a service (e.g. client). Such a performance monitoring system can monitor the interactions between the customer and client to determine whether the client is being effective in addressing the intent of a customer. Such monitoring can also provide training data for updates to intent identification engine 715, AI engine 735, intent modeling engine 730, quality evaluation engine 725, or any other aspect of intent management engine 615. For instance, the performance monitoring system may evaluate any customer utterances to determine whether the intent is being fulfilled as new intent indicator data is received from a customer (e.g. monitoring frustration levels or machine learning identified indicators that a customer is not achieving expected results from interactions with current nodes of a client system). As an illustrative example, the performance monitoring system may determine that when the customer responds with "Done," the customer has acknowledged positive results from a client provided routing path, and that the customer was able to select a routing path to achieve the customer's intent. Further, when the customer responds with "Thanks! That worked!" the performance monitoring system may determine that the customer's intent has been met. This information can then be used to update machine learning models for any aspect of the system, including analysis of other user's intent indicator data to identify intent values for future system users. For instance, the performance monitoring system may implement an investigative algorithm that monitors client metrics to determine why certain routing paths are selected with negative or positive customer results. Based on this determination, the performance monitoring system can provide feedback to a machine learning algorithm to update operations, node selections, and routing paths to improve system performance. In different implementations, such updates can be aggregated and presented to a client for approval and publication to user facing communication channels, or can be configured for automatic continuous real-time or near real time (e.g. as queued in a system given processing and other resource limitations) dynamic updates. In some examples, the dynamic updates are automatically implemented with threshold tracking to check shifts in annotation data and require customer review when certain thresholds are exceeded by automatic dynamic updates. For example, if a certain word is assigned an initial correlation value with an intent category, a threshold change of more than a given percentage (e.g. 5%, 20%, 50%, etc.) away from the original annotation value can require review and approval by a system administrator or client. This can prevent unexpected trends in data from unexpectedly breaking system operations or generating actions that do not align with user and client expectations. As described herein, a server system can perform any such operations, or the operations can be part of a networked server system with different sub-systems or engines operating together to perform such operations.

The annotation engine 720 may, in conjunction with a processor, receive the identified intent category from the intent identification engine 715. The annotation engine 720 may facilitate annotation of the identified intent. Annotation may define a quality of the association between the communication and the identified intent. In some embodiments, the annotation engine 720 may automatically evaluate the quality of the association by applying a formula. For example, the annotation engine 720 may automatically calculate a quality of 66% between the operative words "pay bill" and the intent "pay_current_bill", while a quality of 100% may be assigned to the operative words "pay bill" and the intent "pay_bill". In some embodiments, the annotation engine 720 may provide the operative words and the identified intent to a user interface of a computing device in order to receive a manual evaluation of the quality of the association. This manual evaluation can be provided as feedback by an agent monitoring an AI based response to a user communication. This manual evaluation can also be used after the communication to generate training data to be used in revisions to any aspect of intent management engine 615.

In some examples, annotation engine 720 can operate in parallel with AI engine 735. In such systems, when intent identification engine 715 selects an intent category, the AI engine and annotation engine 720 are separately provided the intent category. AI engine 735 can automatically select one or more actions based on the intent category. The annotation engine 720 can provide confidence feedback on any aspect of the operation of intent management engine 615. This can include confidence in the selection of a particular intent category when compared with other possible intent categories. This can include confidence among multiple possible actions identified by AI engine 735. Annotation engine 720 can provide a quality check on AI selection operations that can be used both for setting threshold actions for a response to a current communication 705, as well as generating training data for updating any aspect of intent management engine 615. For example, annotation engine 720 can identify a qualitative confidence score associated with an intent or an action responsive to a communication. In some examples, if the annotation engine 720 qualitative score is below a threshold value, a fallback action is taken, such as routing the communication to a particular agent or other endpoint rather than relying on an AI response. In other examples, agents can be grouped by performance. Annotation engine 720 results with high confidence scores can be routed to lower performing agents, as the threshold for error and the expected outcome is less likely to be impacted by the agent performance. Annotation engine 720 results with low confidence scores, where agent discretion is more likely to be important, can be routed to agents with higher performance scores. This can also be used to create confidence in training data, with higher performing agents reviewing complex aspects of intent management engine 615 performance and providing feedback on intent categories that can result in new categories or other significant system changes. Annotation engine 720 can thus, for example, not only provide qualitative values as part of intent category feedback, but can also be used to identify missing categories that can be added to a system, unnecessary or redundant categories (e.g. intent categories which regularly have similar confidence values and result in similar or identical system actions), or other such issues.

The intent modeling engine 730 is configured to, in conjunction with a processor, build a model of intents based on the taxonomy and annotations made for the intents. The model may be used to help refine the intents, add new intents, associate different taxonomy with an intent, associate different intents with certain taxonomy, and the like.

The artificial intelligence engine 735 is configured to, in conjunction with a processor, apply artificial intelligence to the intent model to aggregate intent-related data and draw conclusions about actions that may be taken based on the results and analysis. The artificial intelligence engine 735 may be implemented by, for example, a computer configured with artificial intelligence systems to learn, apply, and iteratively develop better models for reflecting intents. These models may be refined over time with incoming data to learn trends in the data and to better predict intents. As described above, artificial intelligence engine 735 may be part of a system with multiple AI engines, or can include different AI systems. For example, in certain systems, each intent category can be associated with a different neural network. The specific combinations of operative words or words received in a communication can be analyzed by a specific neural network customized for a particular intent category. By using different neural networks for narrower intent categories, the size and complexity of the individual neural networks is limited and can be managed and more efficiently in the context of system resource limitations. For example, a neural network deciding whether a user is attempting to pay a current bill, a past bill, or a partial bill payment will be less complex and resource intensive that a neural network that decides between these options as well as options for account access help, fraud assistance, new account opening, or other widely divergent actions that can occur in a system.

The intent data compiler 740 is configured to, in conjunction with a processor, aggregate the information output by the artificial intelligence engine 735 and formulate it in such a way that can be displayed by the computing device 750. The computing device 750 is able to manipulate and configure the data displayed and analyzed. This can include generating data for the interfaces of FIGS. 11 and 12.

Figure 8:
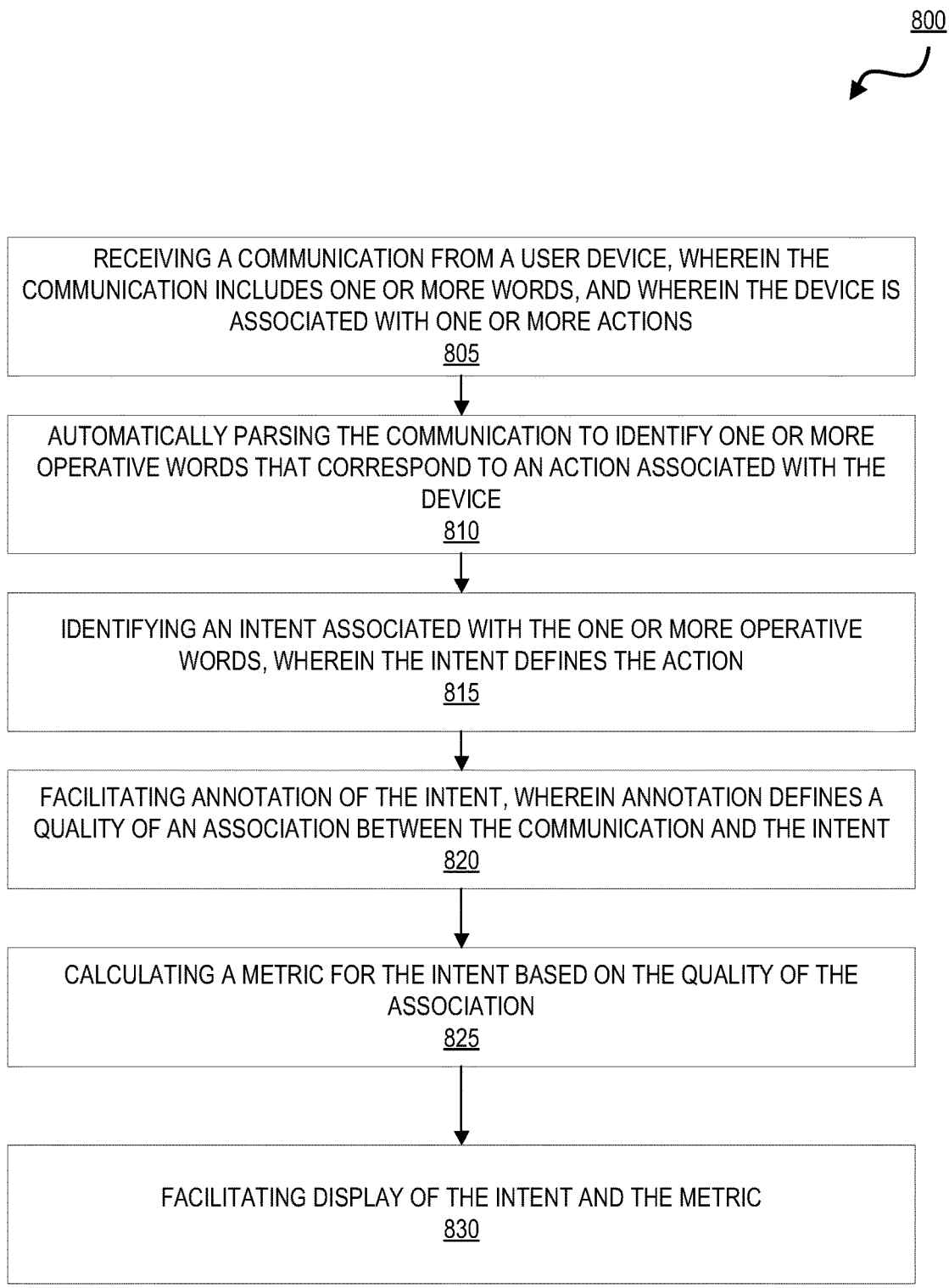
FIG. 8 shows a flowchart of a method embodiment in accordance with some aspects of the present technology.

FIG. 8 shows a flowchart of a method embodiment in accordance with some aspects of the present technology. The described method describes an embodiment of analyzing an intent.

In some examples, method 800 is performed by a computing device. In some examples, method 800 is embodied as instructions that, when executed by one or more processors of a device, cause the device to perform the operations of method 800.

Method 800 includes step 805, where a communication is received from a device. The communication may include one or more words. As described above, the communication can be received in various formats. In some embodiments, the communication may be in natural language. In some examples, the words are configured as audio data that can be processed directly, or converted into text by a server system or in communication with speech to text services provided by another networked device. The device may be associated with one or more actions. The actions can be associated based on a user intent that is discovered by an intent management engine 615 which processes the data from the communication to select an intent category and assign an associated action. User feedback received in response to the taken action can be used to determine if the correct associated action has been identified, or if addition actions are needed to proceed to the user's preferred result, which is an associated action that the user has contacted the system to achieve.

At step 810, the communication may be automatically parsed to identify one or more operative words that correspond to the action associated with the device. For example, the communication may state, "I want to speak to a representative." The operative word in that communication may be "representative". The operative words may be identified by comparing the words to identified operative words in a database. In other examples, the parsing can be performed by a natural language processor, a natural language analysis system, a neural network, or any other such machine based analysis of the communication.

At step 815, an intent associated with the one or more operative words may be identified. The intent may define the action. For example, for the operative word "representative", the pre-defined intent may be "transfer_to_agent". The intent may be identified, in some embodiments, through stored associations between operative words and intents, as stored in a database. Thus, the intent may be identified through a search of an intent database. The intents may be better identified and refined over time with increased quality by applying artificial intelligence and/or machine learning to historical and current data to make better predictions of intents. In some examples, the operations of step 810 and 815 can be part of a combined or multi-step process. For example, an initial parsing can be performed to select operative terms that are input to a neural network. An output of the neural network is the intent category which has an associated action (e.g. an action defined by the intent category). In some examples, the neural network can serve as both the parsing of the communication and the identification of the intent. In some examples, an initial intent identification can be used to refine the analysis. For example, a loop can be initiated, with an initial identified intent used to re-parse the communication based on the initial intent, and a subcategory identification for an intent category made based on the additional analysis. For example, a communication "I'm worried about my bill payment" can be parsed to identify bill payment and an initial "bill payment" category. A subsequent parsing can identify "worried" as an additional operative term that can result in a sub-category intent identified as "current bill" or "overdue bill payment". Various systems can include multiple tiers of such analysis.

At step 820, annotation of the intent may be facilitated. Annotation may define a quality of an association between the communication and the intent. Annotation may be done automatically by applying algorithms in one embodiment. In some embodiments, annotation may be completed manually based on the correlation of the original communication and the identified intent. The quality can be annotated in any suitable form, including words (e.g., "yes" and "no"), percentages (e.g., "80%"), numbers (e.g., on a scale from 1 to 10), etc. In some examples, the annotation analysis is performed using history data independent of the identification analysis. In some examples, the annotation is performed by an agent reviewing AI engine operations that perform the identification of step 815. In some examples, both AI based and agent based annotations can be generated to created qualitative feedback on the association between the communication (e.g. words in the communication) and the intent (e.g. the selected intent category from among possible intent categories available in a system).

At step 825, a metric may be calculated for the intent based on the quality of the association. The metrics may include, for example, frequency of the intent, most experienced agents for that intent, difficulty levels for an intent, and the like. At step 830, display of the intent and the metric may be facilitated.

In some embodiments, one or more agent profiles may be retrieved based on the intent and the metric. The one or more agent profiles may each be associated with an agent and a terminal device. An agent profile may comprise information associated with an agent having knowledge in a particular intent, category, subject or topic. The agent profile may further include ratings, resolution times, workload, experience, fee structure, geographical location, intents of interest, training needs, difficulty levels, and the like.

In some embodiments, an agent profile of the one or more agent profiles may be selected. The agent profile may be selected based on a correlation of the agent profile to the intent and the quality of the association between the communication and the intent. The correlation of the agent profile to the intent may indicate that the intent matches, or is closest to, an intent of which the agent is knowledgeable or has experience, for example. The agent profile may further be selected based on the quality of the association between the communication and the intent. For example, if there is 100% confidence that the communication is associated with the intent, a certain agent very knowledgeable with that intent may be selected. If the confidence is relatively low, e.g., 50%, an agent less knowledgeable with that intent may be selected because it is less likely that the correct intent was identified, and the most knowledgeable agent may not be needed.

In some embodiments, the communication may be routed. When the communication is received at the terminal device associated with the agent profile, execution of the action is facilitated. For example, if the intent indicates that a user wants to speak to an agent, a communication channel may be opened between the user and the agent.

Figure 9:
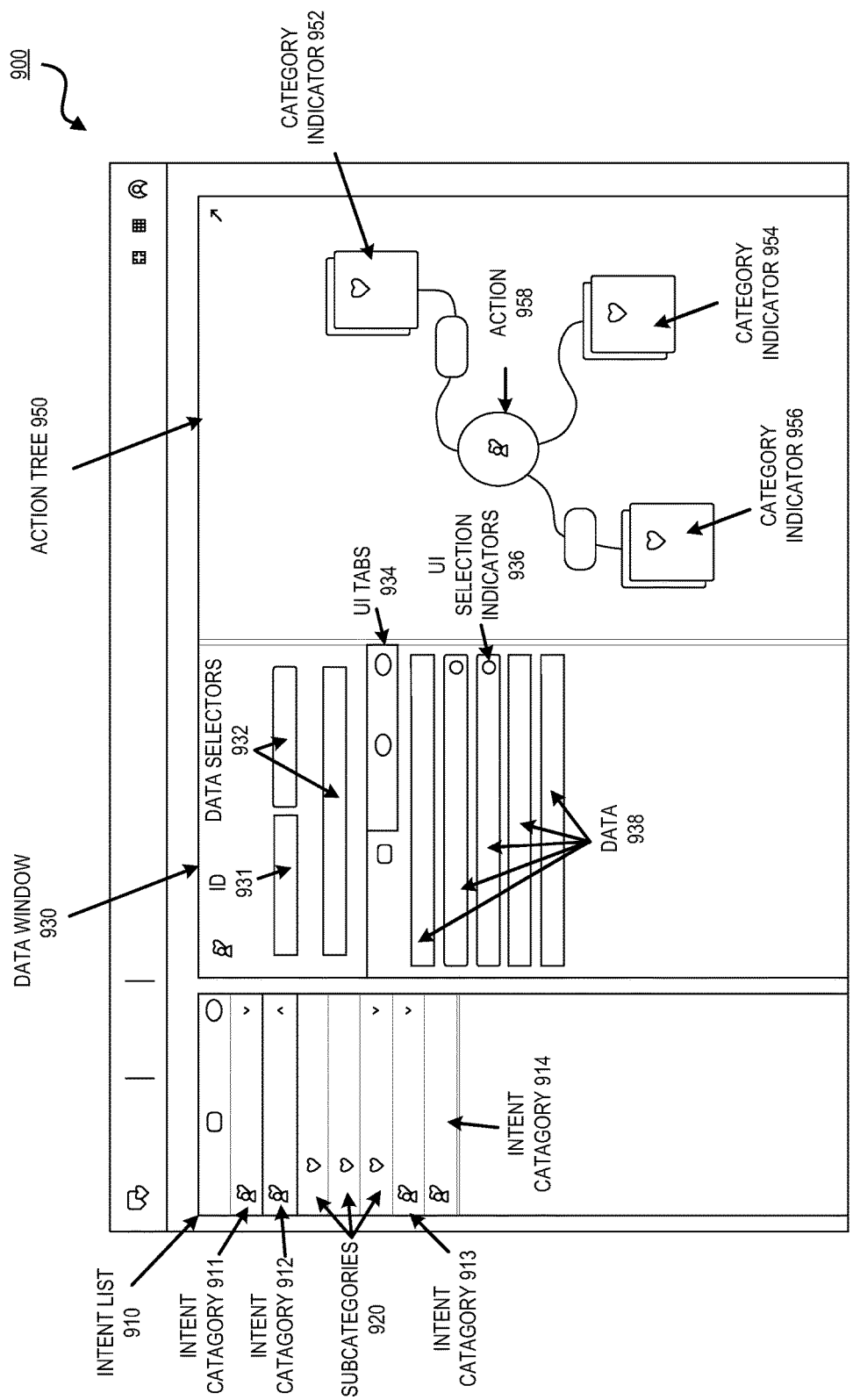
FIG. 9 show example screen shots of an interface to build intent models in accordance with some aspects of the present technology.

FIG. 9 shows example screen shots of an interface 900 for intent models in accordance with some aspects of the present technology. FIG. 9 illustrates a system client's ability to choose intents and customize the intent taxonomy. As shown, interface 900 includes intent list 910 with intent categories 911, 912, 913, 914 and intent subcategories 920. This intent list 910 can be considered a set of intents available for a certain client of a service that provides communication system intent analysis as described herein. This can, in accordance with examples described herein, be a bank, a medical service provider, a manufacturer or merchant of a product where support is provided for the product, or any other client that supports communications with users as described herein. Interface 900 can allow a client to add or modify intent categories available to users contacting an AI supported communication system. Subcategory data window 930 and action tree 950 allows the client to view and modify data associated with the intent categories available to users. For example, various other illustrated tabs of the user interface 900, a user may create training data, review annotation quality, train models, and publish a model. FIG. 9 particularly illustrates an example customization interface for establishing intents in accordance with some aspects of the present technology. In the example of FIG. 9, a taxonomy of intents (e.g. intent list 910) either be entered manually or selected from a pre-defined list. As a system operates, in some examples AI and machine learning algorithms can automatically create additional intent categories or subcategories. In other examples, the AI or machine learning systems can suggest additional intent categories and a customer can select how these suggestions are added to system operations by selecting suggestions for addition to intent list 910. In some examples, additional groupings can be present. For example, multiple lists of intent categories can be grouped together according to domain, and each domain may have its own set of intents. The set of intents can be saved by version as generic or customized. Additionally, multiple tiers of subcategories can be used. For example, each of subcategories 920 can have a sub-subcategory, the sub-subcategories can also have further subcategories structured below them, and so on, depending on the particular structure of actions and refinements to intent determination for a particular system client.

Data window 930 and action tree 950 then describe additional information about categories in intent list 910 and the relationships between the categories in the list. Data window 930 can be used both to generate training data for an intent category and to display examples of information for actions associated with an intent category or subcategory. ID 931 is a field that identifies displayed data (e.g. by intent category, subcategory, database entry, etc.), and data selectors 932 can be used to sort or select data 938 for display in data window 930. Data 938 can include suggested words or phrases that can be associated with an intent category or subcategory. When an intent list 910 is initially generated, this list can be seeded based on expected information for a client type, and the list of data 938 can then be updated with words and phrases actually used by users contacting a system. As communications with users occur and the words from a user communication are associated with intent categories, and the communications result in a resolution of the user interaction (e.g. positive and negative resolutions), the words associated with an intent category and successfully resolved can be added to data 938 for a particular intent. Words that result in unsuccessful resolution, or that frequently result in a system shifting from one intent category and associated actions for the category to a different category with different associated actions can be removed from data 938 for one category and placed with data for another category. In some examples, annotation information for certain data 938 can be used to allow a client to make selections to shift phrases and word associations to different intent categories (e.g. using UI selection indicators 936 to emphasize or de-emphasize associations between certain words and certain intent categories or subcategories.) Different UI tabs 934 can be used to select different types of data 938 for display, such as seeded phrases, custom client provided phrases, machine learning suggested phrases, comments or history data for data 938, or other such information.

Action tree 950 then allows a visual indication of relationships between different intent categories and subcategories and association actions. The example category indicators shown as category indicator 952, 954, and 956 are shown as associated with action 958. In some examples, action 958 can be a request for additional user information to clarify a user's intent and focus a system to a narrower subcategory such as subcategories 920 from a broader intent category 912. Action tree 950 can also be used to visualize relationships between categories that result in the same action 958 or in different actions that can branch out from an intent category. This action tree 950 can be used by a client to structure and select actions, and to modify actions associated with certain categories. This can include adding annotation information to be used for certain input words. This can also include an interface to display and modify information about actions or intents that regularly result in negative user feedback or which have poor correlations or results. A client of the system can modify the actions or data for an intent to attempt to achieve better results for the intent category. AI or machine learning systems can, in some examples, automatically make such changes or can suggest changes for client approval based on system history data (e.g. analysis of loops and conversation paths through different words or intent categories that resulted in different resolutions).

Interface 900 allows a client to insert and track custom intents. Interface 900 allows these custom intents to be defined and associated with training data. Annotation data can be added to the custom intents to set a bar on the intent detection quality for the model(s) associated with custom intents in a system. In some examples, this can allow modifications to a system to be modeled in an analysis system before updates or changes to the interface category structures are published to an active system that is accessible by users. This can include creation of an offline system (e.g. an updated version of intent management engine 615) that can be processed with training data, annotation quality, and trained models prior to publication to users. Additionally, such an offline system can be used to update a published system by making changes using updated training data generated using active system histories. This can include integrating customer feedback and system results into the training data used for updated versions of a prior published system, and integration of new annotation quality data into new versions of a system as more information is gathered, or as features and changes to system structures occur. For example, if a client of a system releases a new product with different associated actions than previous products, and old products are no longer supported, the actions for a client can change, and the expected user words and associations between words in user communications can change. Such changes can be modeled with an offline version prior to publication to a live user facing system. Similarly, as a banking system rolls out new products, as a medical service offers new procedures, or as other clients business changes result in changes to expected communications from clients, the communication system can be updated to accommodate these changes and to keep track of changes in intent categories for users that contact the system for information and actions associated with a client.

Figure 10:
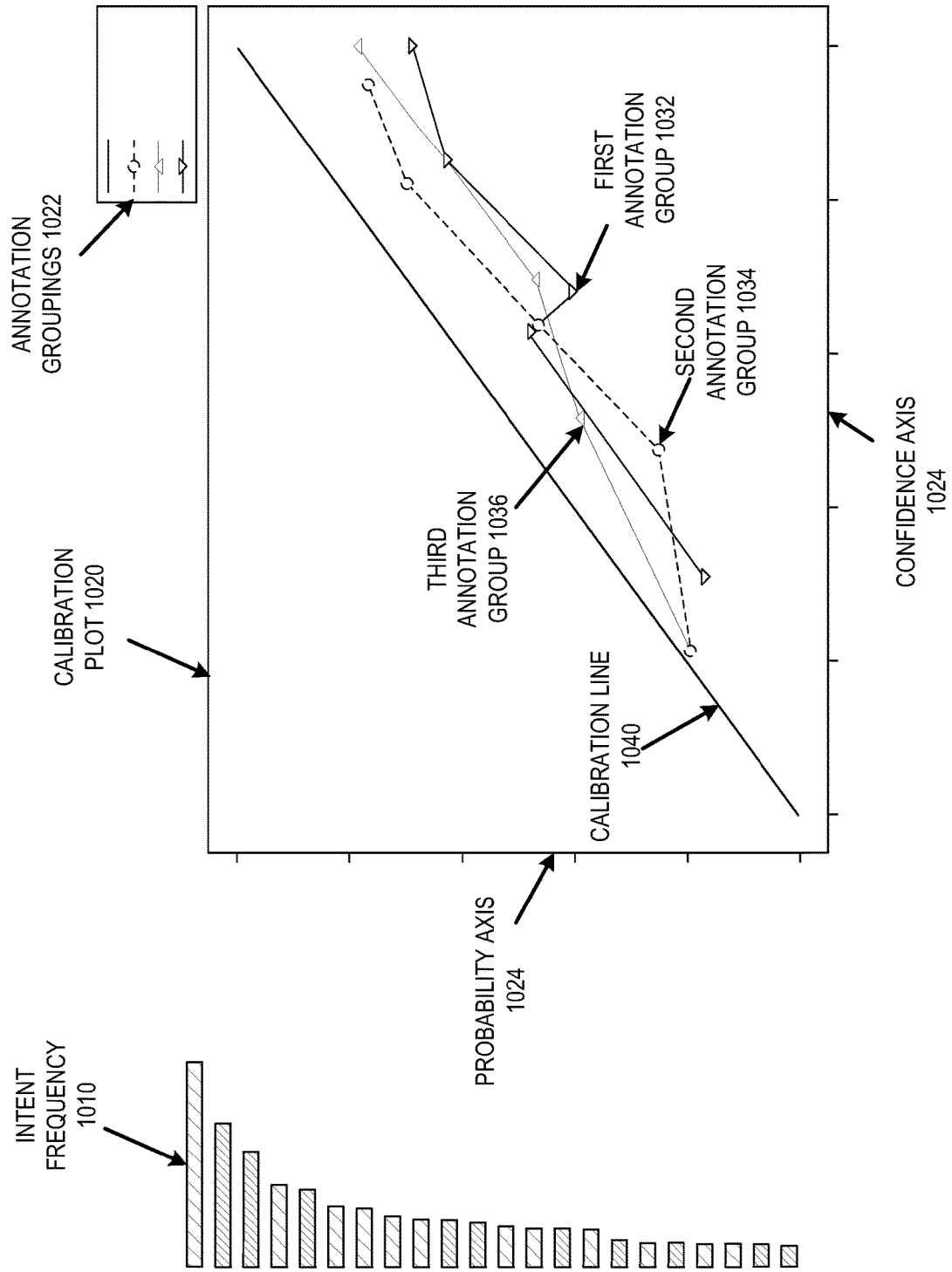
FIG. 10 shows a configuration plot for annotation of intents in accordance with some aspects of the present technology.

FIG. 10 shows a calibration plot 1020 for annotation values and intent categories with an illustrated intent frequency 1010. As described above, annotations can provide qualitative information about intents, such as an association between words in a user communication and an intent category. For example, when initial training data is provided to a system, annotation values can indicate a score or confidence percentage that certain words will indicate a user intent for a certain intent category and actions for the intent category. For example, a particular word can have assigned annotation values for more than one intent category, with different qualitative strength values assigned. Calibration plot 1020 includes calibration line 1040 which is the ideal association between annotations and the probability that certain words will result in assignment to a correct intent category. Annotation groupings 1022 can be used to identify how combinations of annotations interact to result in category assignments, so that a particular annotation group has confidence values and probability values that are charted along confidence axis 1024 and probability axis 1024. As illustrated, graphs for a first annotation group 1032, a second annotation group 1034, and a third annotation group 1036 are shown. Using calibration plot 1020, different annotations and annotation groups can be used in a live system to improve the performance (e.g. to improve system matches between user communications and intent categories with actions resulting in positive resolutions to user communications). Initial intent category assignments can be based on these annotation values, and these annotation values can be modified automatically by machine learning operations as a system receives data associated with user communications. of intents in accordance with some aspects of the present technology. FIG. 10 illustrates the frequency of a plurality of intents shown as intent frequency 1010. For example, the longest bar can be associated with a most frequently assigned intent category (e.g. "request_bill_or_fees_information") and the shortest bar for a least frequently assigned category (e.g. "pre-order_product") for an example implementation. FIG. 10 further shows a calibration plot 1020 graphically showing the probability of correct prediction and a confidence score for an intent category matched to an incoming user communication grouped by various annotators. This allows annotators to be modified to adjust the system results as words in user communications are matched to intent categories. For example, the calibration plot 1020 can be set to identify that the term "request" is overweighted to "product purchase" and underweight to "request bill". Annotations can be shifted to increase the probability of a "request bill" intent category being assigned with the word "request" is present in a user communication, and to reduce the probability of the intent category "product purchase" being assigned with "request" is present in a user communication.

Figure 11A:
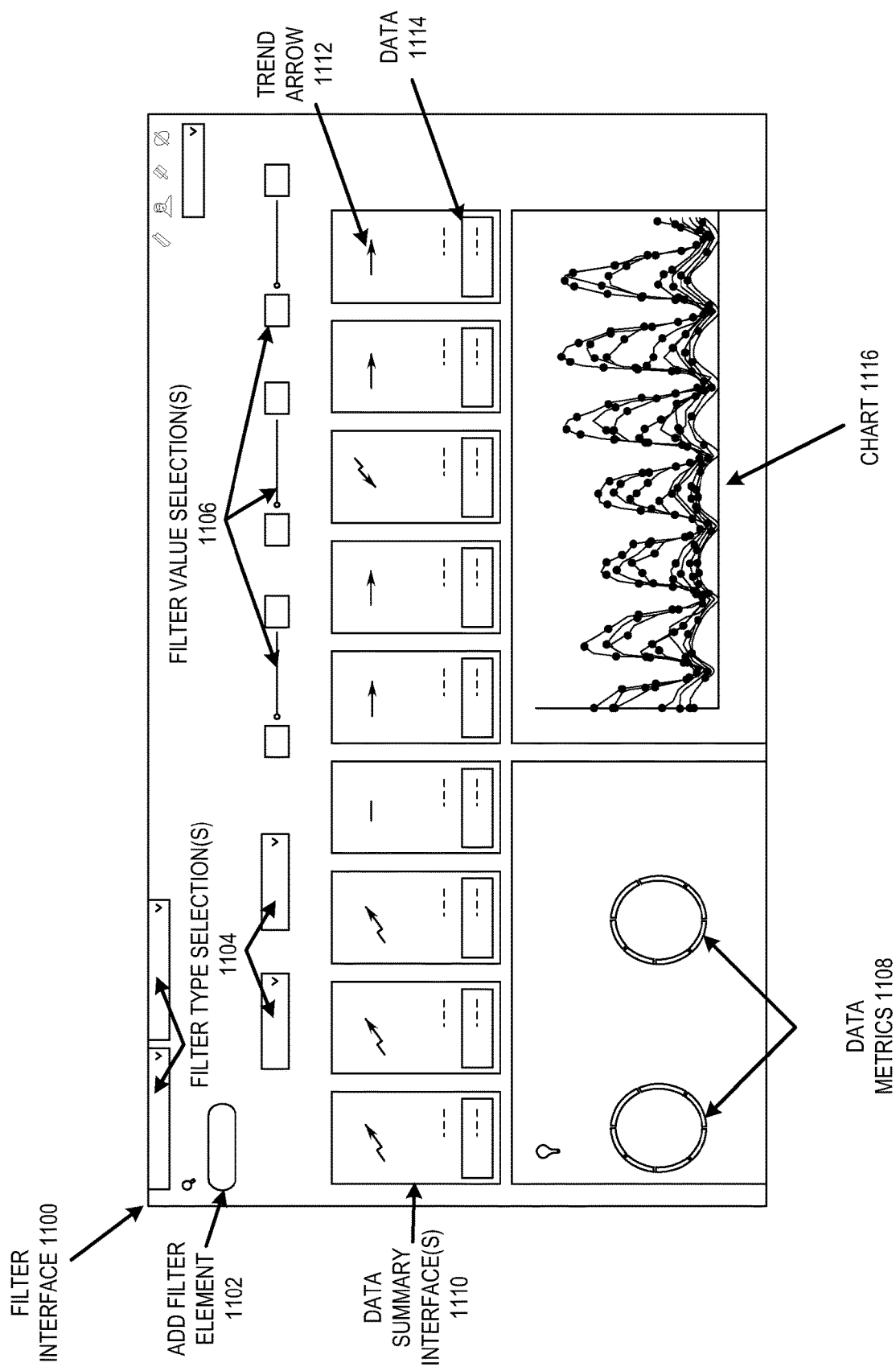
FIGS. 11A-11F show example dashboard reports for an intent-driven contact center in accordance with some aspects of the present technology.

FIGS. 11A-11F show examples of aspects of dashboard reports for an intent-driven contact center in accordance with some aspects of the present technology. FIG. 11A is a screen shot of a dashboard filter interface 1100 showing metrics for communications and intents. For example, FIG. 11A can include data that illustrates summary information about a number of conversations, an average duration of a communication session, an intent score, intents by conversations, intent trends, intent durations, or other such information as data 1114 using data summary interface 1110, data metric 1108 graphics, and chart 1116 data. These analytics can become available as users contact the intent-driven contact center and their intents are ascertained. Interface elements for adding filters, selecting filters, and setting value ranges for filters can be used to select the displayed data using add filter element 1102, filter type selections 1104, filter value selections 1106 and other such user interface selections. For example, in the illustrated filter interface 1100, data summary interfaces 1110 can show different summary data types in associated data 1114 areas of each interface area, along with an associated trend arrow 1112 for each interface. Chart 1116 can show a volume of intent category assignments over time. For example, each line of chart 1116 can indicate a volume of intent assignments in a given hour of a day for a given geographic area (e.g. where intent assignments drop to near zero in the middle of the night). Each intent category can have a one or more associated data summary interface 1110 that shows statistical values about the intent category, such as a daily average volume, a weekly average volume, a weekly average trend (e.g. change) over the past year, or any other such metrics. Examples described herein can facilitate display of intent and metric data for an AI assistance communication system using an interface such as filter interface 1100 or other such interfaces.

Figure 11B:
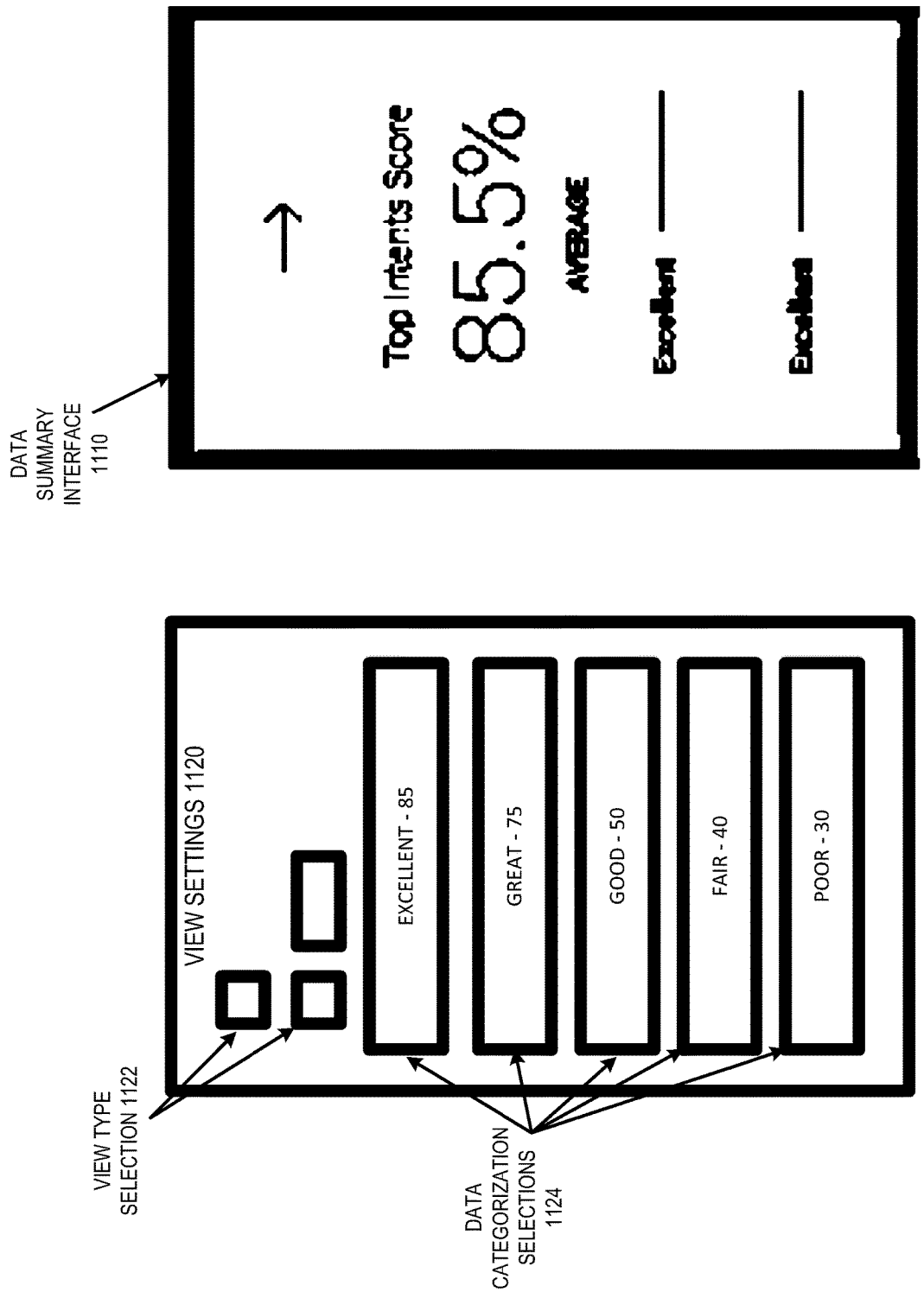

FIG. 11B includes aspects of a dashboard report interface or other such interfaces that can include data summary interface 1110 example showing top intents scores and the associated view settings 1120 interface with calibration settings available to manage top intents scores displayed in various data summary interface 1110 areas (e.g. of filter interface 1100). The example view settings 1120 interface allows data categorization selections 1124 to assign a qualitative text value to intent scores (e.g. excellent, great, good, fair, poor). Additionally, interface elements such as view type selection 1122 can be used to select standard settings for a particular data summary interface 1110 such as the example of FIG. 11B.

Figure 11C:
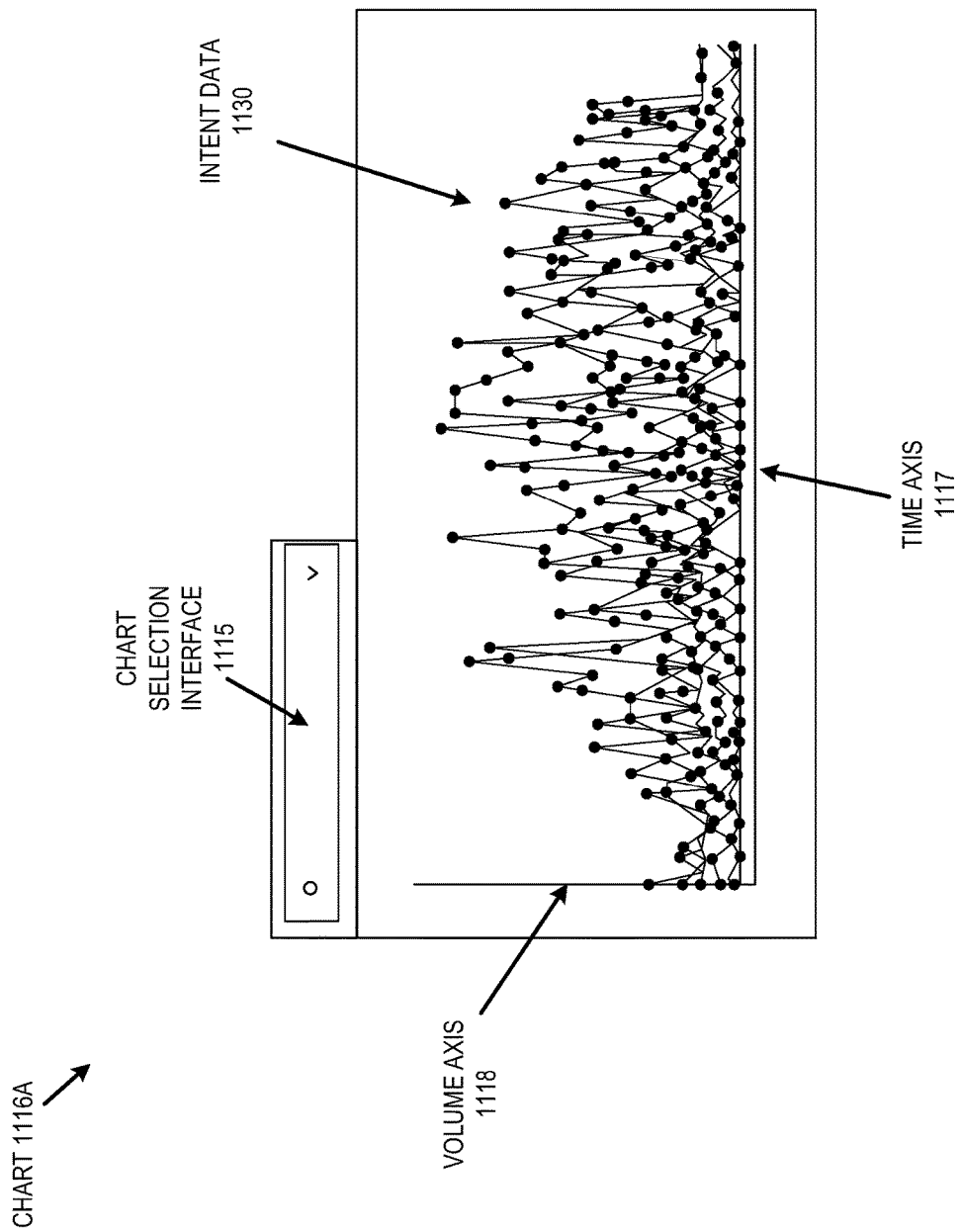
Figure 11D:
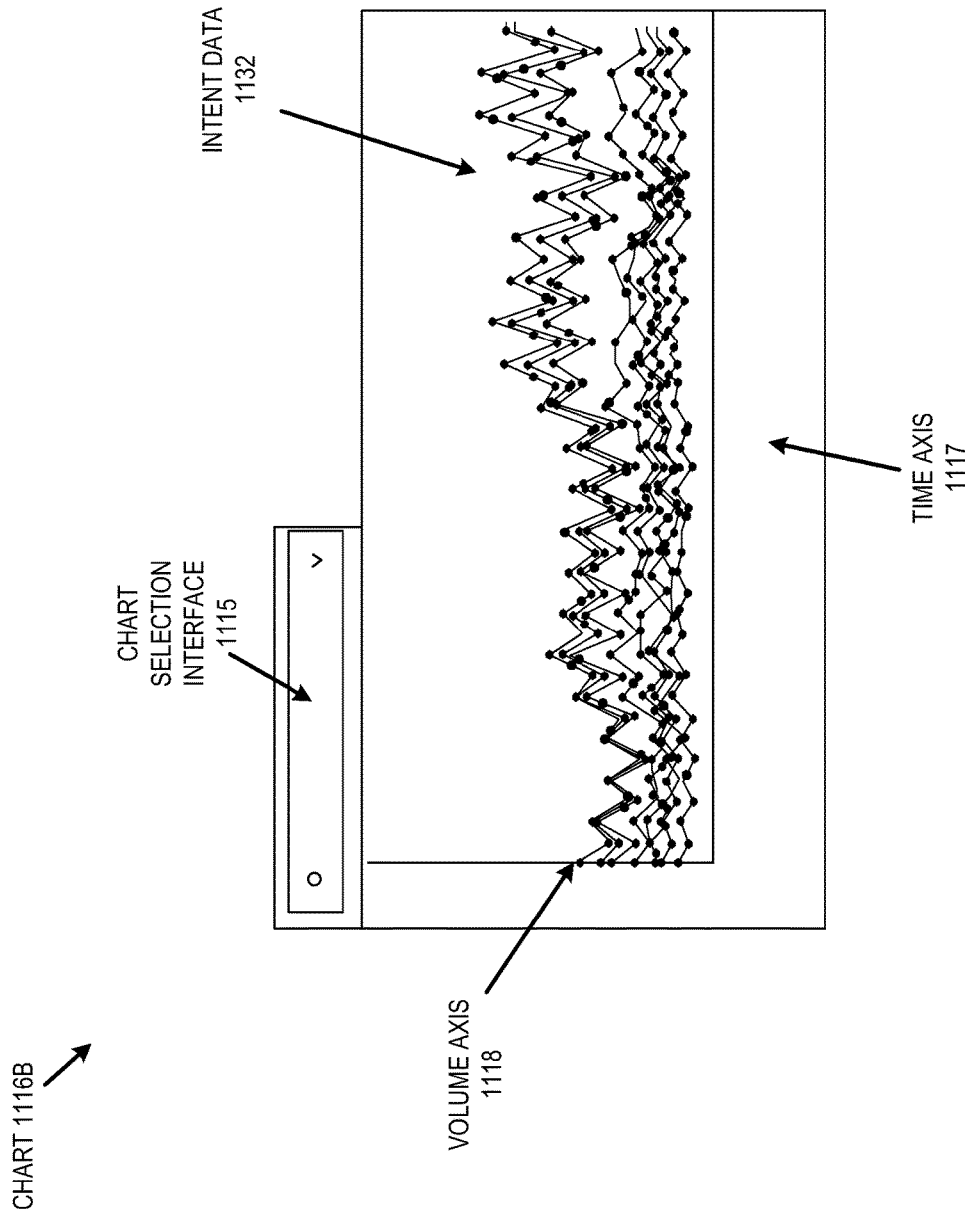
Figure 11E:
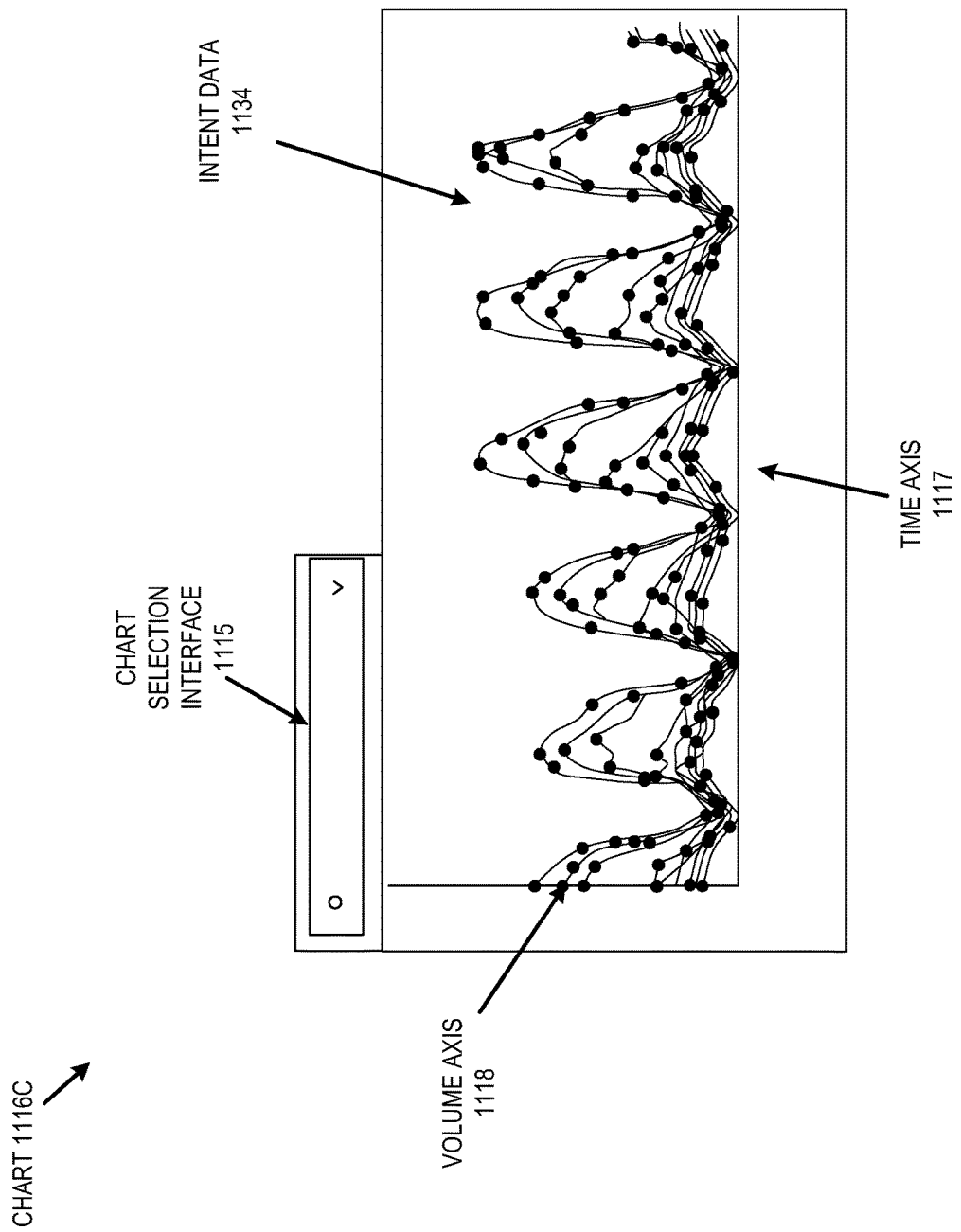

FIGS. 11C, 11D, and 11D are examples of chart 1116, shown as charts 1116A, 1116B, and 1116C. Each example chart 1116 is a dashboard report showing volumes of conversations by intent, with a horizontal time axis 1117, and a vertical volume axis 1118. The particular intent data for a chart 1116 can be selected using a chart selection interface 1115 value. This can select one or more filter characteristics for the intent data of a chart (e.g. overall time period, geographic area, associated agent(s), intent subgroups for an intent category, related intent category groupings, etc.) Illustrated chart 1116A includes intent data 1130, chart 1116B includes intent data 1132, and chart 1116C includes intent data 1134. The volume axis 1118 shows a number of times an intent category is assigned in a time period along time axis 1117. The time axis can be structure so that each data point is the number of assignments per minute, per ten-minute increment, per hour, or per any other selected period for time axis 1117. In some implementations, the time axis 1117 period can be set by a user interface selection of an interface such as a filter value selection 1106 of filter interface 1100.

Figure 11F:
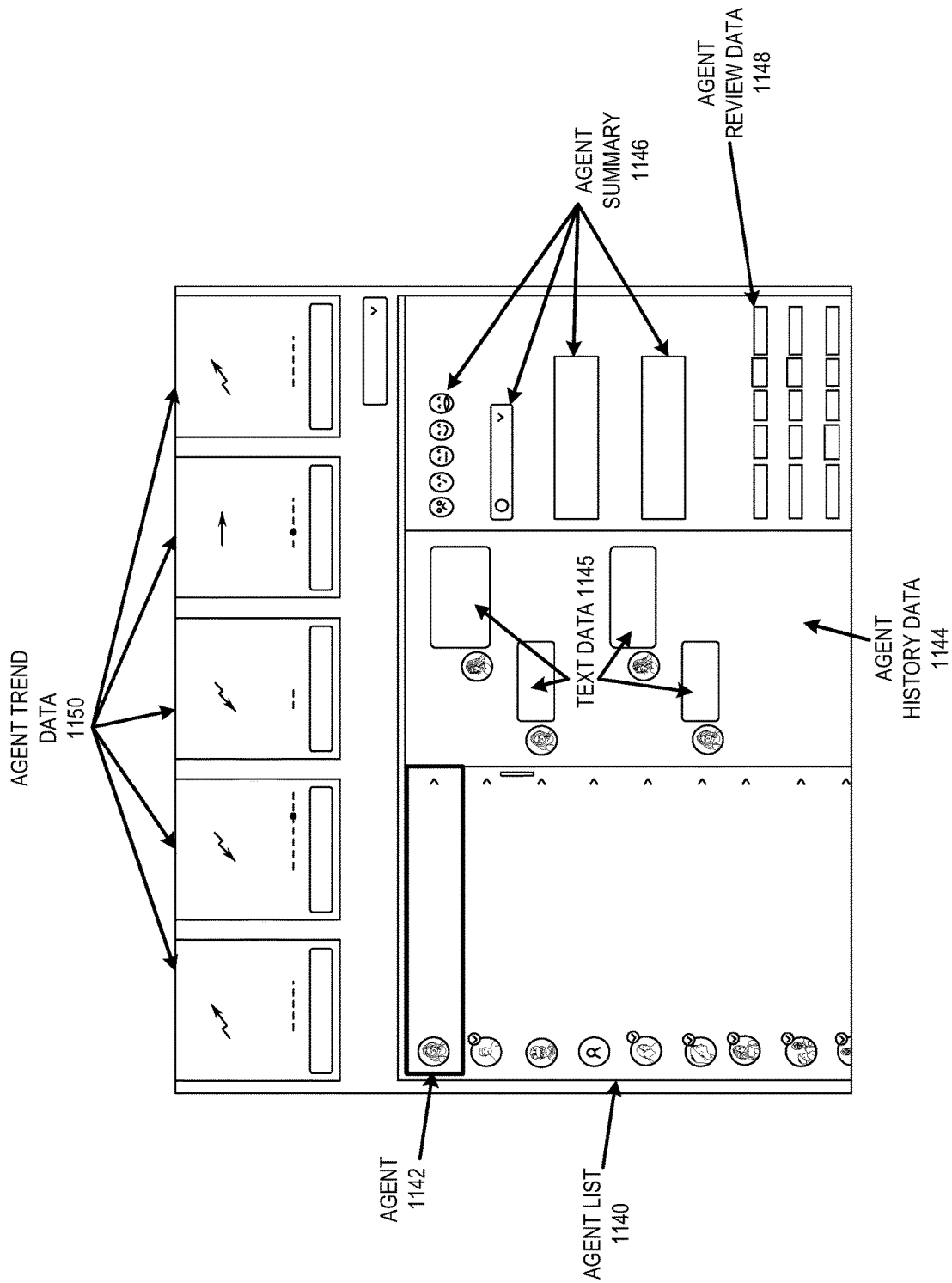

FIG. 11F is a screen shot of a dashboard showing agent conversations with users. As described herein, in some examples, actions taken by a system can be fully automated, so that an intent category results in an automated action taken by a system (e.g. a responsive communication transmitted automatically using system AI, language processing, or other systems). In other examples, some or all actions can be AI assisted actions involving an agent using a computing device to implement the AI assistance to the agent. In such implementations, system data can be tracked by intent categorization and by agent. The interface of FIG. 11F includes an agent list 1140 that allows a particular agent, such as agent 1142 to be selected. Agent trend data 1150 and associated summary data can show metrics that integrate intent data and agent data in one or more summary areas of an interface. This can include trends in how long a conversation with a given intent category lasts for a given agent, and statistical trends overtime for the agent. This can include trends for different intent categories or groups of intent categories or subcategories. Examples of specific conversations involving an agent and a user can be displayed in agent history data 1144. In some examples, AI systems can process all communications involving an agent and automatically generate a representative set of conversations, including an average conversation and any conversations that fall outside of sets of threshold parameters. Additionally, the natural language processing systems or other systems used to identify words from user communications can also be used to identify certain words in agent responsive communications in text data 1145 for an agent conversation. Such information can be displayed in agent history data 1144 interface, along with additional agent summary 1146 data and agent review data 1148. The dashboard of agent history data 1144, agent summary 1146, and agent review data 1148 shows messages exchanged with the user, overall metrics for agent conversations, and ratings and resolutions boxes. Agent summary 1146 data can include metrics on agent performance such as user ratings, conversation times, comparative rankings with other agents, areas or intent categories where the agent's conversations are above or below threshold comparisons with other agents, or other such information. Agent review data 1148 can include specific feedback received by a system from users that are part of conversations with a given agent (e.g. the user involved in the conversation that includes text data 1145 for agent 1142). As described above, such agent information can be used to assess system updates as feedback and trends are integrated into the AI and machine learning systems. For example, in some implementations, only intent data associated with agents having certain summary data metrics (e.g. threshold response times, threshold user feedback scores, etc.) are used in updating AI systems using machine learning.

Figure 12:
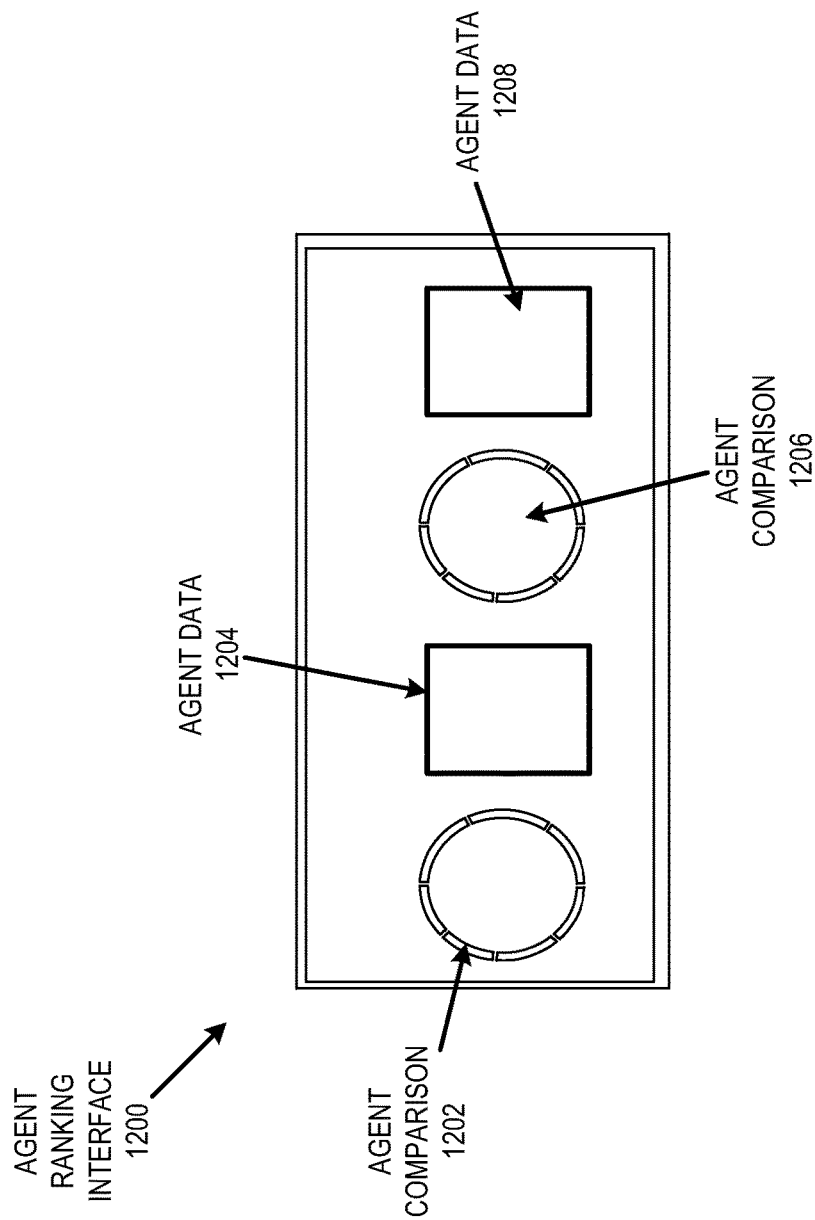
FIG. 12 shows example agent rankings for an intent-driven contact center in accordance with some aspects of the present technology.

FIG. 12 shows example agent ranking interface 1200 for an intent-driven contact center in accordance with some aspects of the present technology. The agent rankings include agents by total customers engaged and agents by volume of conversation. These analytics can become available as conversations are handled and resolved by agents over time. In the example of FIG. 12, agent data 1204 can include a list of top ranked agents for a given intent category, along with a graphic with an agent comparison 1202. The agent comparison graphic can include a top metric value for a top agent, and color bars showing a share of volume handled by the top agents. Similarly, agent data 1208 can include a list of lowest performing agents with a similar graphic for agent comparison 1206, that can show a lowest performance value for a lowest ranked agent. Such an agent ranking interface 1200 can provide system feedback on performance variation. In some systems, information about the standard deviation among agents and various bands of performance can be presented. As with other interfaces, this information can be broken down by intent category, time, geography, or any category of data stored by a system.

In various implementations, the above AI and machine learning systems can be integrated with interfaces to provide information about system use and operation. Such interfaces can be dynamically and continuously updated in real-time (e.g. as processed given resource limits) to provide feedback on system performance and system use. Such examples improve the operations of a communication system by providing information on the performance of the system and allowing errors or improvements in the system to be identified prior to failures. Such interfaces additional improve the operations of a communication system by facilitating updates for added functionality and actions in response to user intents (e.g. addition of new actions as new communication paths or functionality is added to respond to user preferences and to meet user intent associated with the user accessing a communication system). Further, the AI and machine learning systems above provide improvements to the performance of the devices beyond the interfaces. As described above, this includes improvements in responsive performance and reduction of processing resources that are wasted when actions taken by a system that use computing resources do not align with results expected by a user. These resources are wasted, and additional resources are used in system loops as the system attempts to arrive at an action that meets a user intent. The described improvements in intent matching of user communications to intent categories improves the efficiency of the involved computing devices, saving power and system resources while providing communication and processing utility to users on behalf of system clients (e.g. that structure the intent categories and actions for users). While various steps are described above, it will be apparent that certain steps can be repeated, and intervening steps can be performed as well. Additionally, different devices in a system will perform corresponding steps, and various devices can be performing multiple steps simultaneously. For example, a device can perform such steps to route requests to multiple agents simultaneously, with devices of multiple different agents performing corresponding operations, and the agent devices communicating with user devices.

Figure 13:
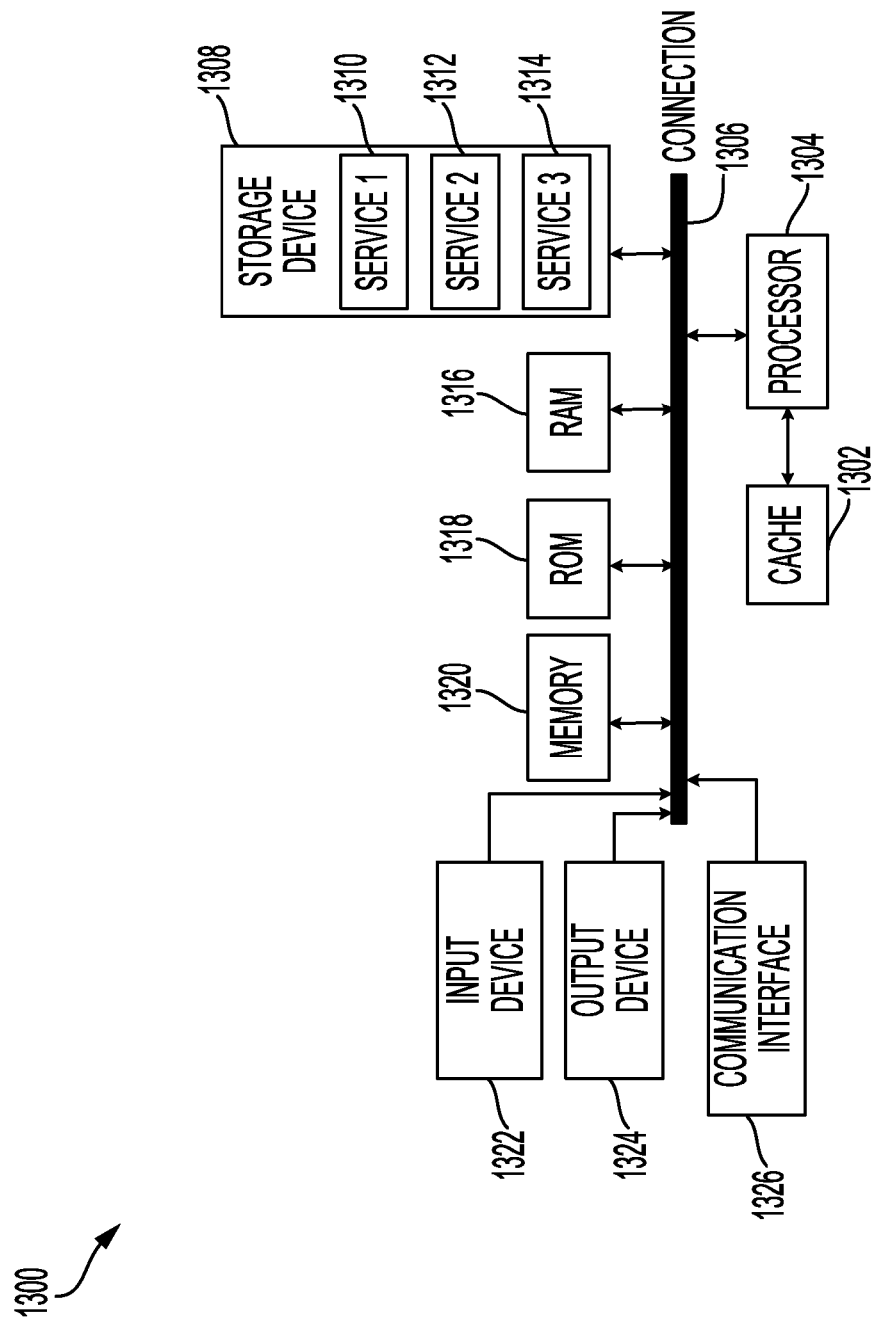
FIG. 13 illustrates an example computing device that can be used to implement aspects of an intent driven communication systems in accordance with some implementations of the present technology.

FIG. 13 illustrates a computing system architecture 1300 including various components in electrical communication with each other using a connection 1306, such as a bus, in accordance with some implementations. Example system architecture 1300 includes a processing unit (CPU or processor) 1304 and a system connection 1306 that couples various system components including the system memory 1320, such as ROM 1318 and RAM 1316, to the processor 1304. The system architecture 1300 can include a cache 1302 of high-speed memory connected directly with, in close proximity to, or integrated as part of the processor 1304. The system architecture 1300 can copy data from the memory 1320 and/or the storage device 1308 to the cache 1302 for quick access by the processor 1304. In this way, the cache can provide a performance boost that avoids processor 1304 delays while waiting for data. These and other modules can control or be configured to control the processor 1304 to perform various actions.

Other system memory 1320 may be available for use as well. The memory 1320 can include multiple different types of memory with different performance characteristics. The processor 1304 can include any general purpose processor and a hardware or software service, such as service 1 1310, service 2 1312, and service 3 1314 stored in storage device 1308, configured to control the processor 1304 as well as a special-purpose processor where software instructions are incorporated into the actual processor design. The processor 1304 may be a completely self-contained computing system, containing multiple cores or processors, a bus, memory controller, cache, etc. A multi-core processor may be symmetric or asymmetric.

To enable user communication with the computing system architecture 1300, an input device 1322 can represent any number of input mechanisms, such as a microphone for speech, a touch-sensitive screen for gesture or graphical input, keyboard, mouse, motion input, speech and so forth. An output device 1324 can also be one or more of a number of output mechanisms known to those of skill in the art. In some instances, multimodal systems can enable a user to provide multiple types of input to communicate with the computing system architecture 1300. The communications interface 1326 can generally govern and control the user input and system output. There is no restriction on operating on any particular hardware arrangement and therefore the basic features here may easily be substituted for improved hardware or firmware arrangements as they are developed.

Storage device 1308 is a non-volatile memory and can be a hard disk or other types of computer readable media which can store data that are accessible by a computer, such as magnetic cassettes, flash memory cards, solid state memory devices, digital versatile disks, cartridges, RAMs 1316, ROM 1318, and hybrids thereof.

The storage device 1308 can include services 1310, 1312, 1314 for controlling the processor 1304. Other hardware or software modules are contemplated. The storage device 1308 can be connected to the system connection 1306. In one aspect, a hardware module that performs a particular function can include the software component stored in a computer-readable medium in connection with the necessary hardware components, such as the processor 1304, connection 1306, output device 1324, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form. As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform as events occur or in batch mode aggregating multiple events, such as over one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD- ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer system. The interface can include an analog modem, Integrated Services Digital network (ISDNO modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file routing system, such as a disk operating system. One example of operating system software with associated file routing system software is the family of operating systems known as Windows® from Microsoft Corporation of Redmond, WA, and their associated file routing systems. Another example of operating system software with its associated file routing system software is the Linux™ operating system and its associated file routing system. The file routing system can be stored in the non-volatile memory and/or drive unit and can cause the processor to execute the various acts involved by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless ally stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The involved structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

In general, the routines executed to implement the implementations of the disclosure, may be implemented as part of an operating system or an application, component, program, object, module or sequence of instructions referred to as "computer programs." The computer programs typically include one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may include a transformation, such as a physical transformation. With particular types of memory devices, such a physical transformation may include a physical transformation of an article to a different state or thing. For example, but without limitation, for some types of memory devices, a change in state may involve an accumulation and storage of charge or a release of stored charge. Likewise, in other memory devices, a change of state may include a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may include a transformation, such as a physical transformation. Rather, the foregoing is intended as illustrative examples.

A storage medium typically may be non-transitory or include a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any characteristics, features, or aspects of the disclosure with which that terminology is associated. In general, the terms used in the following claims should not be construed to limit the disclosure to the implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 132(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object including a computer-readable medium containing computer program code, which can be executed by a computer processor for performing any or all of the steps, operations, or processes described.

Examples may also relate to an apparatus for performing the operations herein. This apparatus may be specially constructed for the involved purposes, and/or it may include a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Examples may also relate to an object that is produced by a computing process described herein. Such an object may include information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

details were given in the preceding description to provide a thorough understanding of various implementations of systems and components for a contextual connection system. It will be understood by one of ordinary skill in the art, however, that the implementations described above may be practiced without these details. For example, circuits, systems, networks, processes, and other components may be shown as components in block diagram form in order not to obscure the examples in unnecessary detail. In other instances, well-known circuits, processes, algorithms, structures, and techniques may be shown without unnecessary detail in order to avoid obscuring the examples.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included. A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The program code may be executed by a processor, which may include one or more processors, such as one or more digital signal processors (DSPs), general purpose microprocessors, an application integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update system.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The foregoing detailed description of the technology has been presented for purposes of illustration and description. It is not intended to be exhaustive or to limit the technology to the precise form disclosed. Many modifications and variations are possible in light of the above teaching. The described examples were chosen in order to best explain the principles of the technology, its practical application, and to enable others skilled in the art to utilize the technology in various examples and with various modifications as are suited to the particular use contemplated. It is intended that the scope of the technology be defined by the claim.

What is claimed is:

1. A computer-implemented method comprising:
   parsing a communication from an interaction involving a user device to identify one or more operative words from the communication;
   determining an intent value selected from a list of intent categories, wherein the intent value is associated with the one or more operative words in the communication, and wherein the intent value and the one or more operative words are associated with an action for the user device associated with the communication;
   calculating a metric for the intent value using a projection model, wherein the metric is based on a qualitative strength of an association between the one or more operative words in the communication and the intent value, and wherein the metric is calculated using a plurality of communications associated with the intent value, the interaction, and one or more human agent profiles;
   matching the communication with a terminal device associated with a human agent profile, wherein matching is based on the metric;
   tracking user feedback and usage data associated with the interaction; and
   automatically tracking shifts in user expectations by updating the projection model with the user feedback and usage data, wherein the shifts in user expectations comprise changes or shifts in associations between operative words and intent categories that occur over time in user groups associated with a plurality of users and a plurality of user devices comprising the user device.

2. The computer-implemented method of claim 1, wherein tracking the user feedback and usage data comprises:
   receiving the user feedback and usage data associated with the interaction; and
   updating a machine learning algorithm associated with the projection model with updated training using the user feedback and usage data.

3. The computer-implemented method of claim 1, further comprising:
   training an intent management engine using a set of annotation data, wherein the set of annotation data is used by the intent management engine to associate intent values with operative words.

4. The computer-implemented method of claim 1, further comprising selecting a selected human agent profile of the one or more human agent profiles, wherein the selected human agent profile is selected using a machine learning algorithm trained to identify a correlation of the selected human agent profile to the intent value.

5. The computer-implemented method of claim 1, wherein tracking the user feedback and usage data associated with the interaction further comprises:
receiving the user feedback and usage data associated with a plurality of interactions including the interaction;
updating a machine learning algorithm using the user feedback and usage data, wherein the machine learning algorithm is used for matching the communication with the terminal device; and
facilitating a new interaction using the machine learning algorithm as updated using the user feedback and usage data.

6. The computer-implemented method of claim 1, wherein the one or more operative words are identified by comparing words from the communication to one or more known operative words in a database to match words from the communication with the one or more known operative words.

7. The computer-implemented method of claim 1, wherein determination of the intent value is a probabilistic selection based on training of a machine learning system.

8. The computer-implemented method of claim 1, wherein the projection model is a neural network comprising neural network settings that can be modified with real-time dynamic feedback from the user feedback and usage data to track probabilistic shifts in the user expectations from the user feedback and usage data with the neural network.

9. The computer-implemented method of claim 1, wherein the shifts in user expectations comprise changes or shifts in associations between operative words and intent categories that occur over time in a geographic area.

10. A user device comprising:
a memory; and
one or more processors coupled to the memory, the one or more processors configured to perform operations comprising:
parsing a communication from an interaction involving the user device to identify one or more operative words from the communication;
determining an intent value selected from a list of intent categories, wherein the intent value is associated with the one or more operative words in the communication, and wherein the intent value and the one or more operative words are associated with an action for the user device associated with the communication;
calculating a metric for the intent value using a projection model, wherein the metric is based on a qualitative strength of an association between the one or more operative words in the communication and the intent value, and wherein the metric is calculated using a plurality of communications associated with the intent value, the interaction, and one or more human agent profiles;
matching the communication with a terminal device associated with a human agent profile, wherein matching is based on the metric;
tracking user feedback and usage data associated with the interaction; and
automatically tracking shifts in user expectations by updating the projection model with the user feedback and usage data, wherein the shifts in user expectations comprise changes or shifts in associations between operative words and intent categories that occur over time in user groups associated with a plurality of users and a plurality of user devices comprising the user device.

11. The user device of claim 10, wherein tracking the user feedback and usage data comprises:
receiving the user feedback and usage data associated with the interaction; and
updating a machine learning algorithm associated with the projection model with updated training using the user feedback and usage data.

12. The user device of claim 10, wherein the one or more processors are configured for operations further comprising:
training an intent management engine using a set of annotation data, wherein the set of annotation data is used by the intent management engine to associate intent values with operative words.

13. The user device of claim 10, wherein the one or more processors are configured for operations further comprising selecting a selected human agent profile of the one or more human agent profiles, wherein the selected human agent profile is selected using a machine learning algorithm trained to identify a correlation of the selected human agent profile to the intent value.

14. The user device of claim 10, wherein tracking the user feedback and usage data associated with the interaction further comprises:
receiving the user feedback and usage data associated with a plurality of interactions including the interaction;
updating a machine learning algorithm using the user feedback and usage data, wherein the machine learning algorithm is used for matching the communication with the terminal device; and
facilitating a new interaction using the machine learning algorithm as updated using the user feedback and usage data.

15. The user device of claim 10, wherein the one or more operative words are identified by comparing words from the communication to one or more known operative words in a database to match words from the communication with the one or more known operative words.

16. The user device of claim 10, wherein determination of the intent value is a probabilistic selection based on training of a machine learning system.

17. The user device of claim 10, wherein the projection model is a neural network comprising neural network settings that can be modified with real-time dynamic feedback from the user feedback and usage data to track probabilistic shifts in the user expectations from the user feedback and usage data with the neural network.

18. The user device of claim 10, wherein the shifts in user expectations comprise changes or shifts in associations between operative words and intent categories that occur over time in a geographic area.

19. A non-transitory computer readable medium comprising instructions that, when executed by one or more processors of a user device, cause the user device to perform operations comprising:
parsing a communication from an interaction involving the user device to identify one or more operative words from the communication;
determining an intent value selected from a list of intent categories, wherein the intent value is associated with the one or more operative words in the communication, and wherein the intent value and the one or more operative words are associated with an action for the user device associated with the communication;
calculating a metric for the intent value using a projection model, wherein the metric is based on a qualitative strength of an association between the one or more operative words in the communication and the intent value, and wherein the metric is calculated using a plurality of communications associated with the intent value, the interaction, and one or more human agent profiles;

matching the communication with a terminal device associated with a human agent profile, wherein matching is based on the metric;

tracking user feedback and usage data associated with the interaction; and automatically tracking shifts in user expectations by updating the projection model with the user feedback and usage data, wherein the shifts in user expectations comprise changes or shifts in associations between operative words and intent categories that occur over time in user groups associated with a plurality of users and a plurality of user devices comprising the user device.

20. The non-transitory computer readable medium of claim 19, wherein tracking the user feedback and usage data comprises:

receiving the user feedback and usage data associated with the interaction; and updating a machine learning algorithm associated with the projection model with updated training using the user feedback and usage data.

21. The non-transitory computer readable medium of claim 19, wherein the instructions configure the user device for operations further comprising:

training an intent management engine using a set of annotation data, wherein the set of annotation data is used by the intent management engine to associate intent values with operative words.

22. The non-transitory computer readable medium of claim 19, wherein the instructions configure the user device for operations further comprising selecting a selected human agent profile of the one or more human agent profiles, wherein the selected human agent profile is selected using a machine learning algorithm trained to identify a correlation of the selected human agent profile to the intent value.

23. The non-transitory computer readable medium of claim 19, wherein tracking the user feedback and usage data associated with the interaction further comprises:

receiving the user feedback and usage data associated with a plurality of interactions including the interaction;

updating a machine learning algorithm using the user feedback and usage data, wherein the machine learning algorithm is used for matching the communication with the terminal device; and facilitating a new interaction using the machine learning algorithm as updated using the user feedback and usage data.

24. The non-transitory computer readable medium of claim 19, wherein the one or more operative words are identified by comparing words from the communication to one or more known operative words in a database to match words from the communication with the one or more known operative words.

25. The non-transitory computer readable medium of claim 19, wherein determination of the intent value is a probabilistic selection based on training of a machine learning system.

26. The non-transitory computer readable medium of claim 19, wherein the projection model is a neural network comprising neural network settings that can be modified with real-time dynamic feedback from the user feedback and usage data to track probabilistic shifts in the user expectations from the user feedback and usage data with the neural network.

27. The non-transitory computer readable medium of claim 19, wherein the shifts in user expectations comprise changes or shifts in associations between operative words and intent categories that occur over time in a geographic area.

* * * * *